(12) United States Patent
Fujisawa

(10) Patent No.: US 10,333,931 B2
(45) Date of Patent: Jun. 25, 2019

(54) INFORMATION PROCESSING APPARATUS, CONTROL METHOD, AND STORAGE MEDIUM CAPABLE OF TRANSITION TO A POWER SAFE MODE

(71) Applicant: CANON KABUSHIKI KAISHA, Tokyo (JP)

(72) Inventor: Kunimasa Fujisawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 158 days.

(21) Appl. No.: 15/461,185

(22) Filed: Mar. 16, 2017

(65) Prior Publication Data

US 2017/0272434 A1    Sep. 21, 2017

(30) Foreign Application Priority Data

Mar. 17, 2016    (JP) .................. 2016-054388

(51) Int. Cl.
| | |
|---|---|
| H04L 29/06 | (2006.01) |
| G06F 1/3234 | (2019.01) |
| G06F 9/4401 | (2018.01) |
| H04L 29/08 | (2006.01) |
| G03G 15/00 | (2006.01) |
| G06F 1/3287 | (2019.01) |

(52) U.S. Cl.
CPC ..... H04L 63/0876 (2013.01); G03G 15/5004 (2013.01); G03G 15/5091 (2013.01); G06F 1/3234 (2013.01); G06F 1/3287 (2013.01); G06F 9/442 (2013.01); H04L 63/06 (2013.01); H04L 63/08 (2013.01); H04L 67/02 (2013.01); Y02D 10/171 (2018.01)

(58) Field of Classification Search
CPC .................................................. H04L 63/0876
See application file for complete search history.

(56) References Cited

U.S. PATENT DOCUMENTS

| | | | | |
|---|---|---|---|---|
| 7,363,520 B1 * | 4/2008 | Maier, Jr. | .................. | G06F 1/26 713/300 |
| 8,738,940 B2 * | 5/2014 | Venkatrannan | .... | H03K 19/0016 326/102 |
| 2005/0289341 A1 * | 12/2005 | Ritola | ................. | H04L 63/0815 713/168 |
| 2010/0141762 A1 * | 6/2010 | Siann | ..................... | H04N 7/185 348/143 |
| 2013/0103887 A1 * | 4/2013 | Frey | ........................ | G06F 9/442 711/103 |
| 2013/0264878 A1 * | 10/2013 | Swearingen | ......... | B64D 41/007 307/65 |
| 2013/0321851 A1 * | 12/2013 | Miyata | ............... | H04N 1/00896 358/1.14 |
| 2014/0157012 A1 | 6/2014 | Uchida et al. | | |

(Continued)

FOREIGN PATENT DOCUMENTS

| | | |
|---|---|---|
| CN | 103176588 A | 6/2013 |
| CN | 103379247 A | 10/2013 |
| JP | 2014-106835 A | 6/2014 |

Primary Examiner — Ali Shayanfar
(74) Attorney, Agent, or Firm — Canon U.S.A., Inc. IP Division

(57) ABSTRACT

There is provided a mechanism for invalidating, when an apparatus returns from a high-speed shutdown, authentication identification information issued before the apparatus enters the high-speed shutdown.

10 Claims, 17 Drawing Sheets

(56) References Cited

U.S. PATENT DOCUMENTS

| | | | | |
|---|---|---|---|---|
| 2015/0116778 A1* | 4/2015 | Itami | ............... | G06K 15/1849 |
| | | | | 358/2.1 |
| 2015/0346792 A1* | 12/2015 | Rathi | ............... | G06F 1/266 |
| | | | | 713/310 |
| 2016/0105581 A1* | 4/2016 | Hikichi | ............ | H04N 1/00891 |
| | | | | 358/1.14 |
| 2016/0378971 A1* | 12/2016 | Dunstan | ............ | G06F 21/44 |
| | | | | 726/17 |

\* cited by examiner

FIG.2

| AUTHENTICATION SESSION Cookie (201) | AUTHENTICATION SESSION (202) |
|---|---|
| AAAAA | EXPIRATION DATE 201602091135<br>AUTHORITY: GENERAL USER<br>etc |
| BBBBB | EXPIRATION DATE 201602090800<br>AUTHORITY: ADMINISTRATOR<br>etc |

116 ... 203

| HTTP SESSION Cookie (204) | HTTP SESSION (205) |
|---|---|
| 11111 | EXPIRATION DATE 201602091135<br>etc |
| 22222 | EXPIRATION DATE 201602090800<br>etc |

113 ... 206

| HTTP SESSION Cookie (207) | HTTP SESSION (208) |
|---|---|
| 99999 | EXPIRATION DATE 201602091135<br>etc |
| 66666 | EXPIRATION DATE 201602090800<br>etc |

114 ... 209

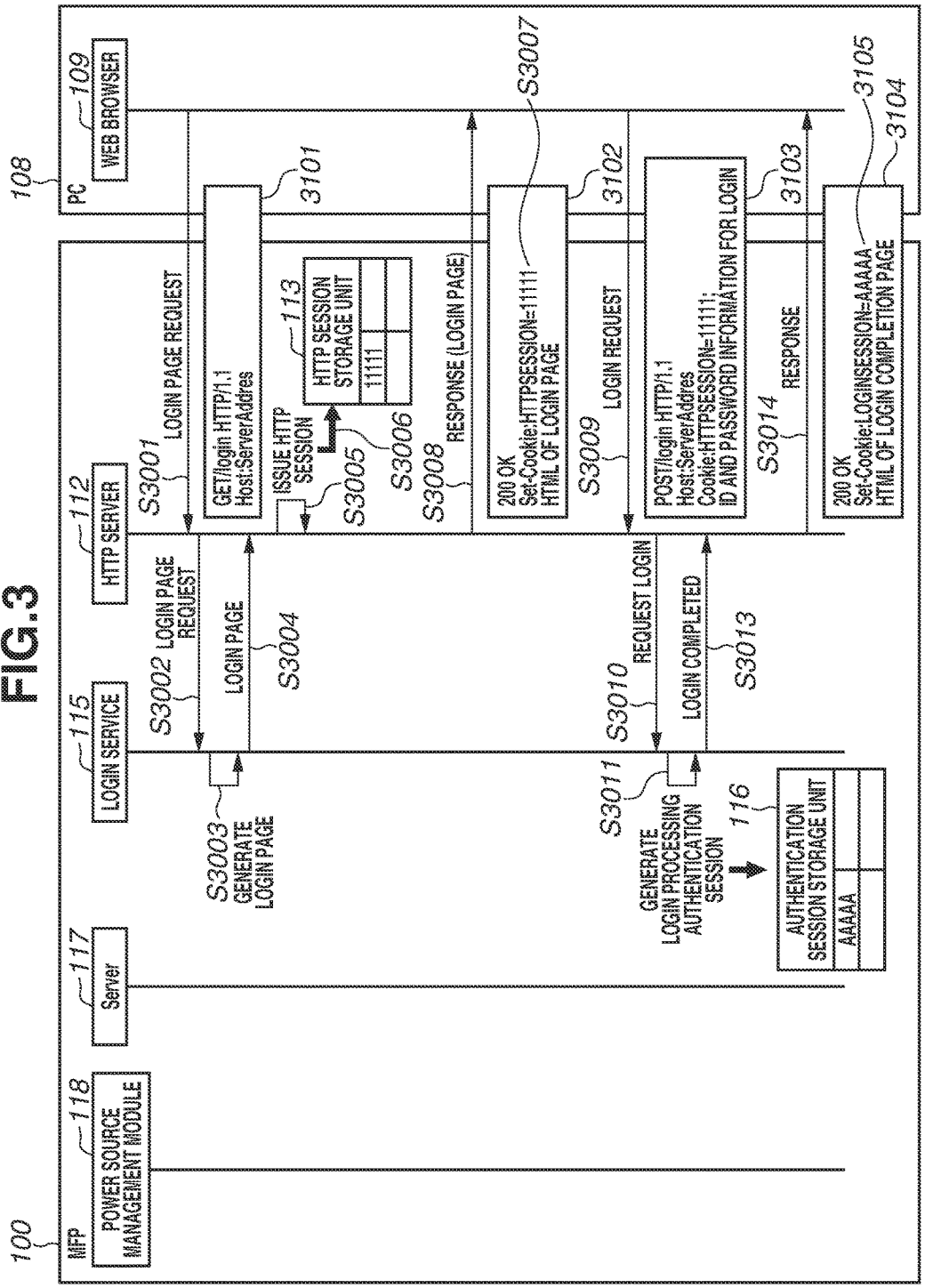

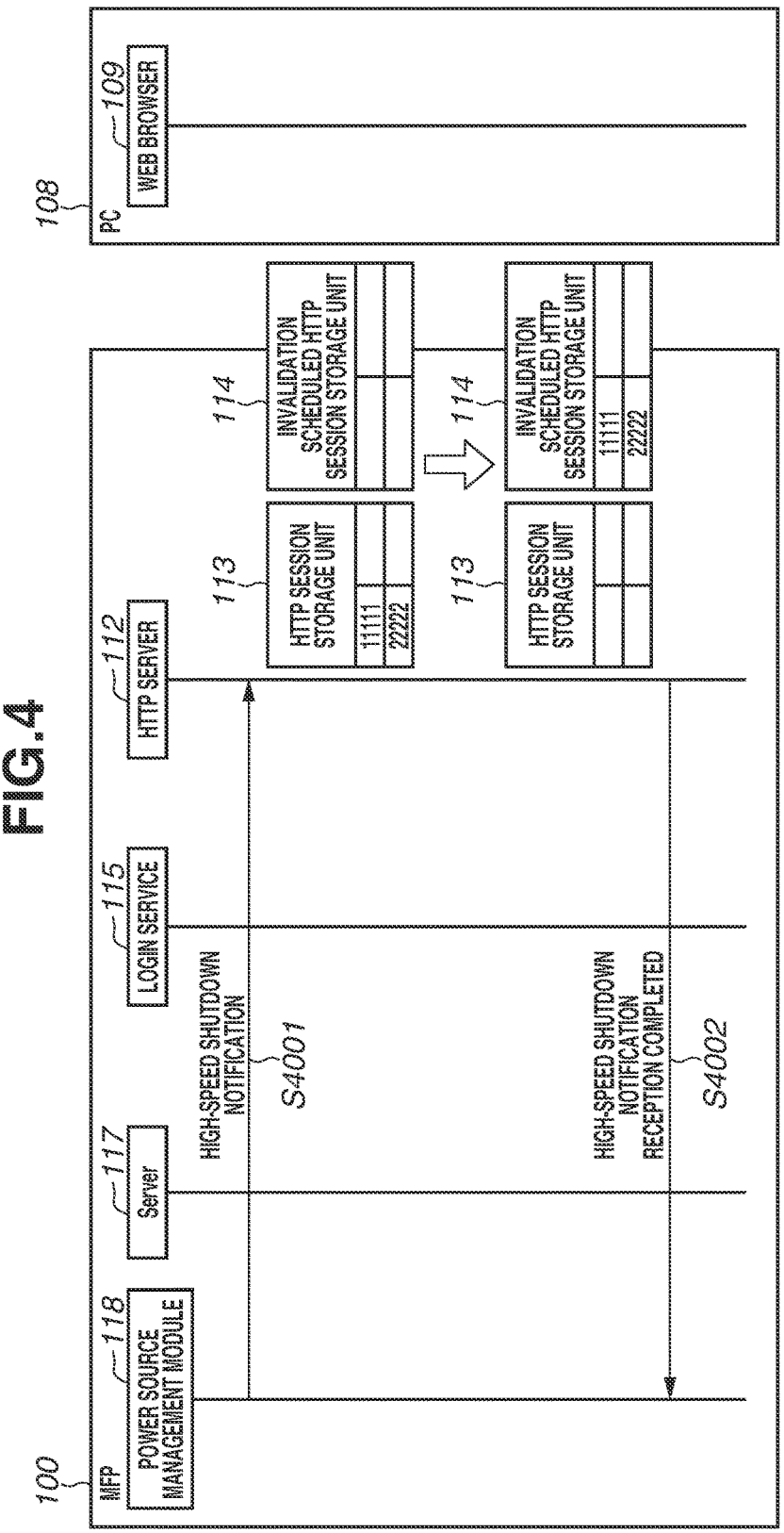

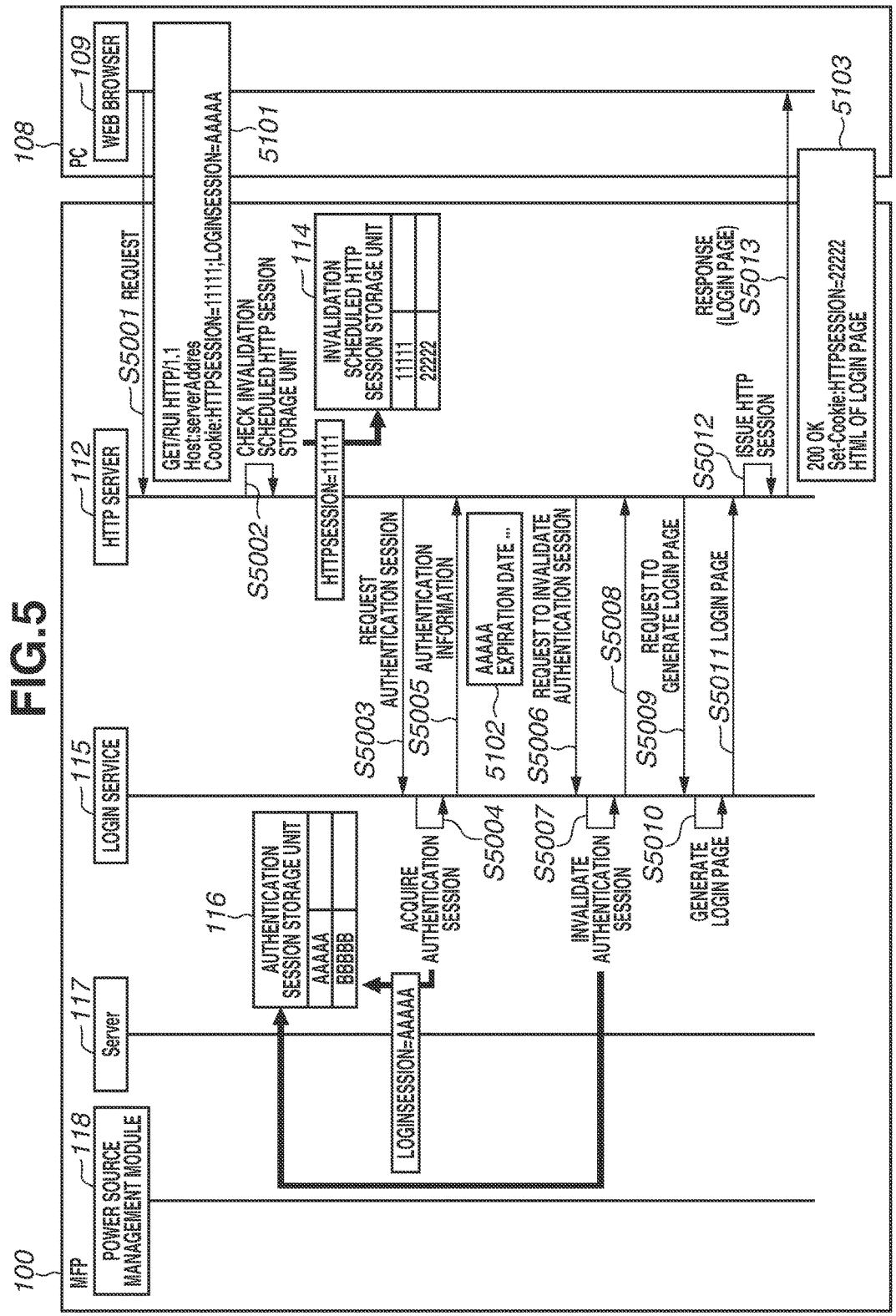

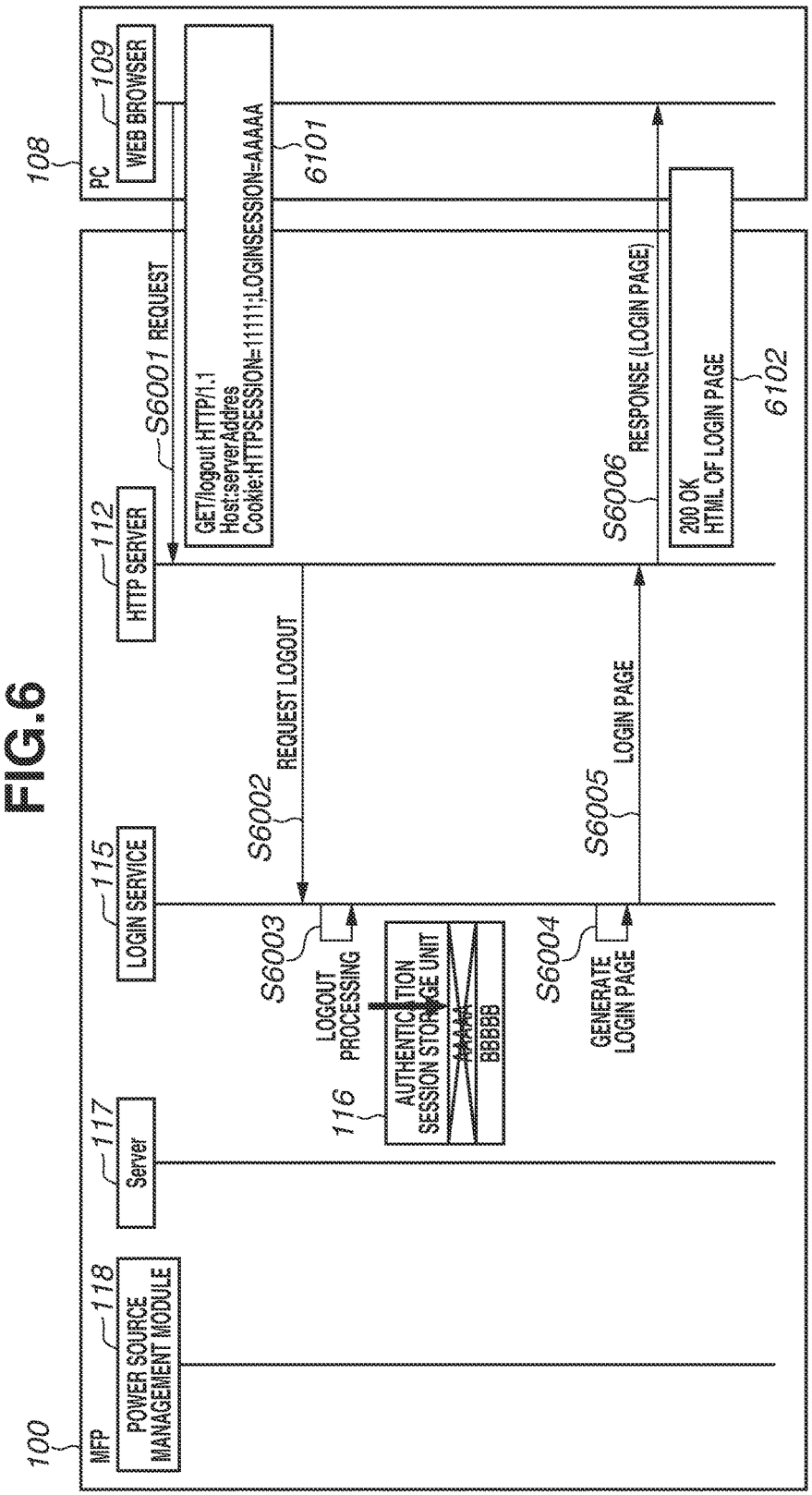

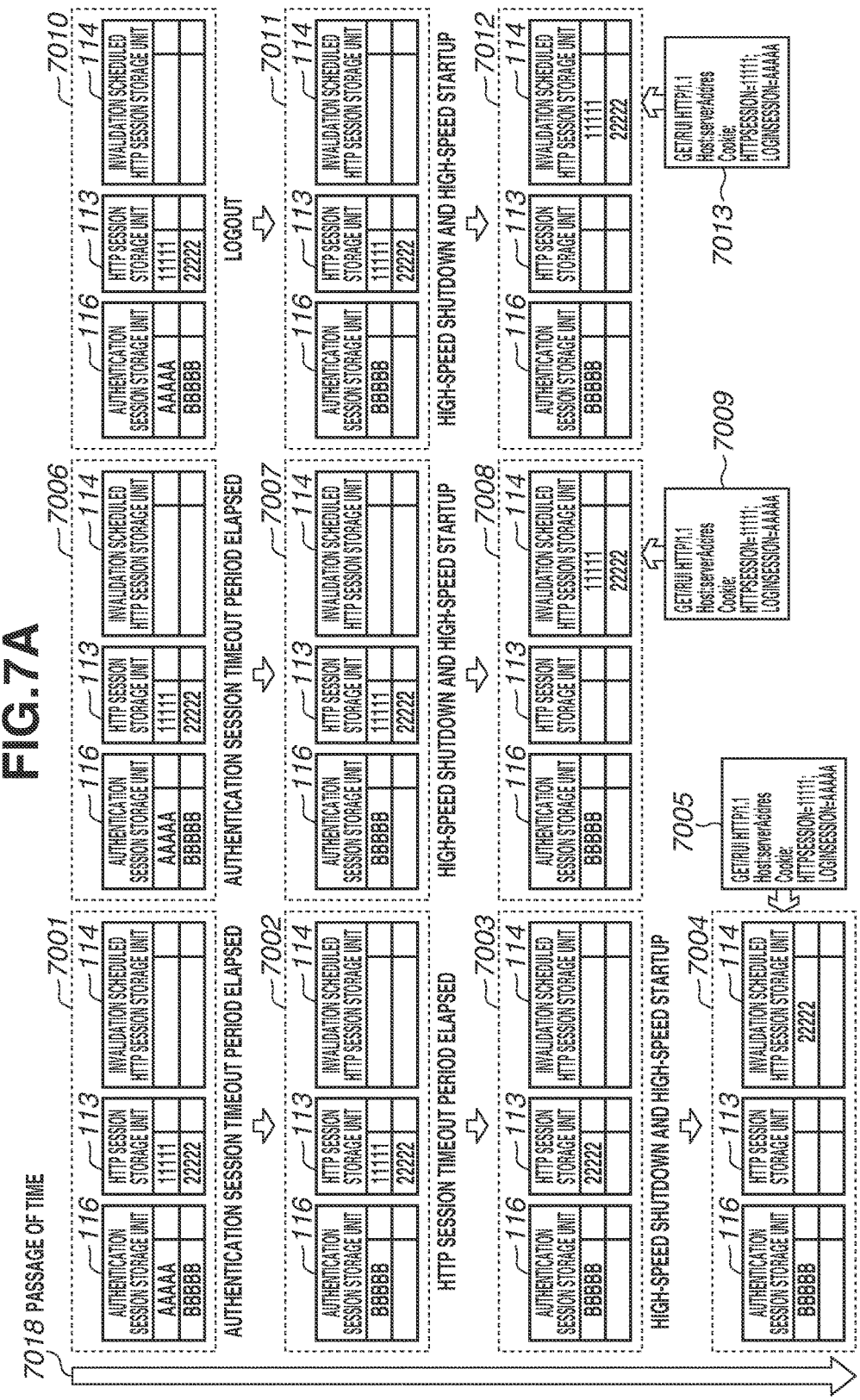

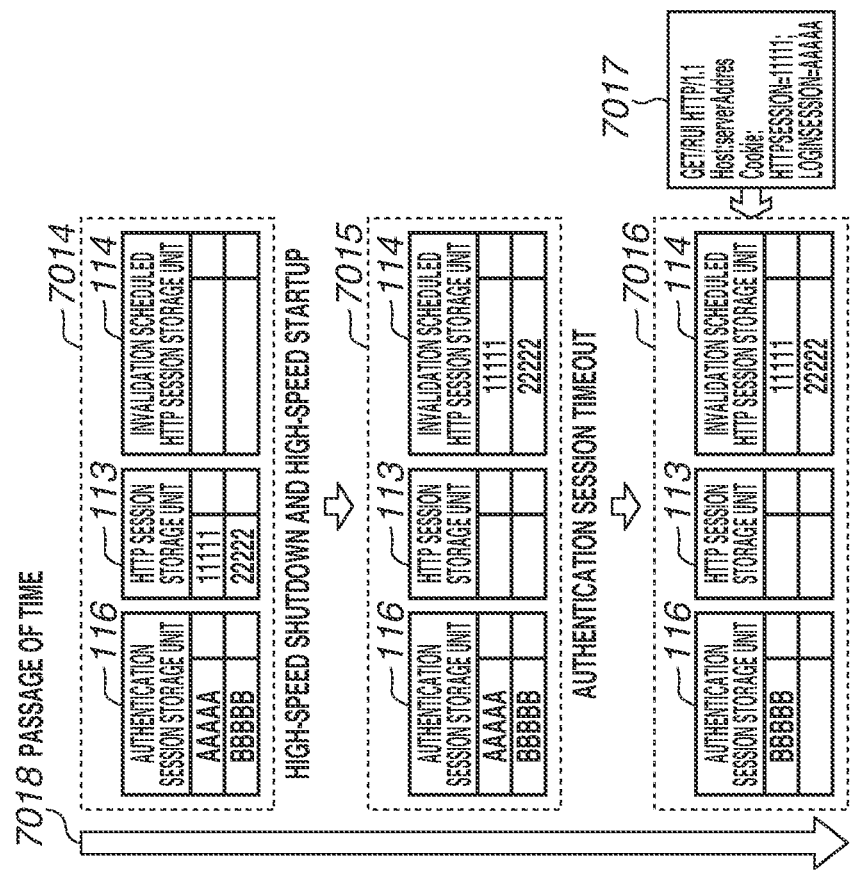

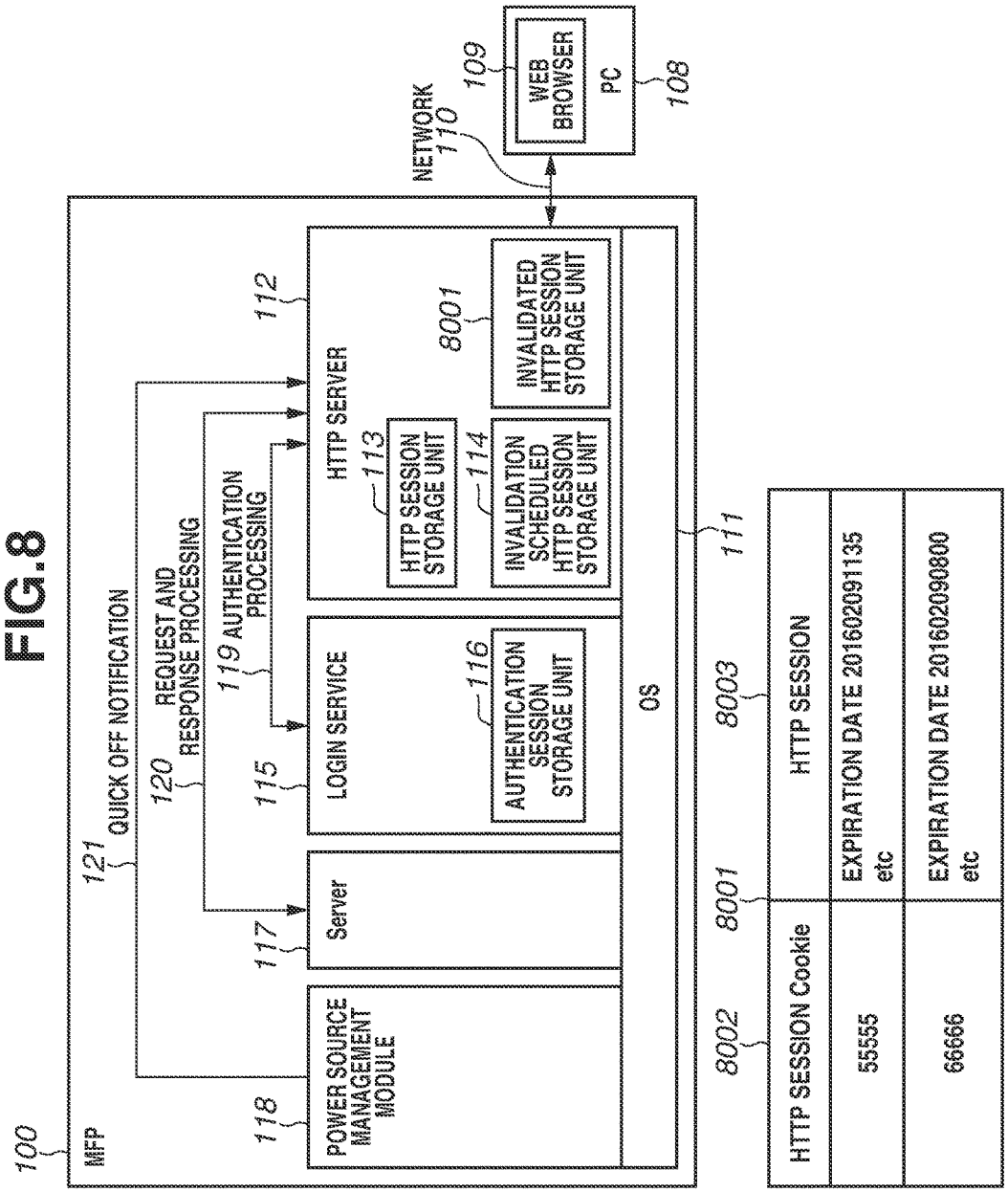

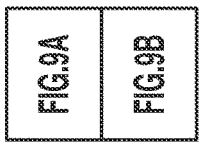
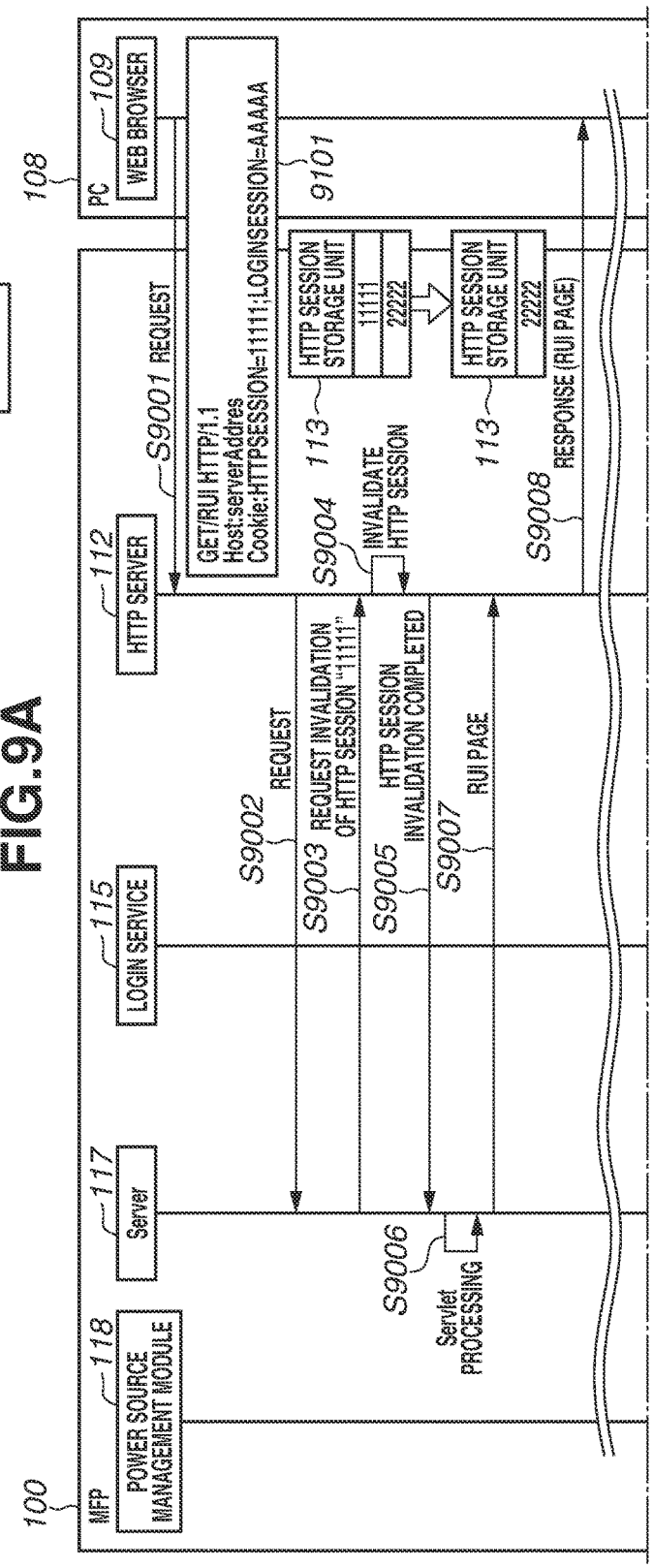
FIG.9A

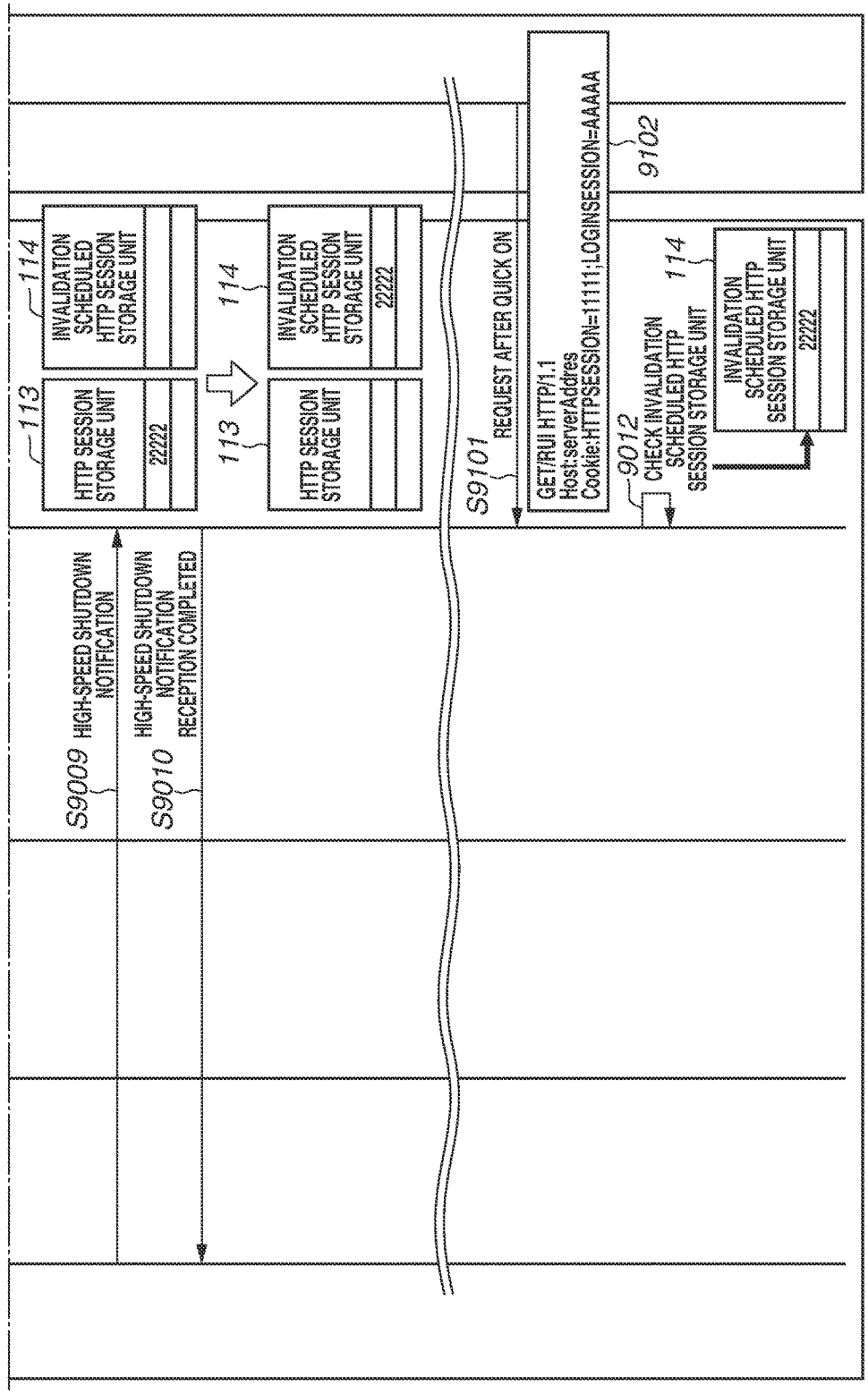

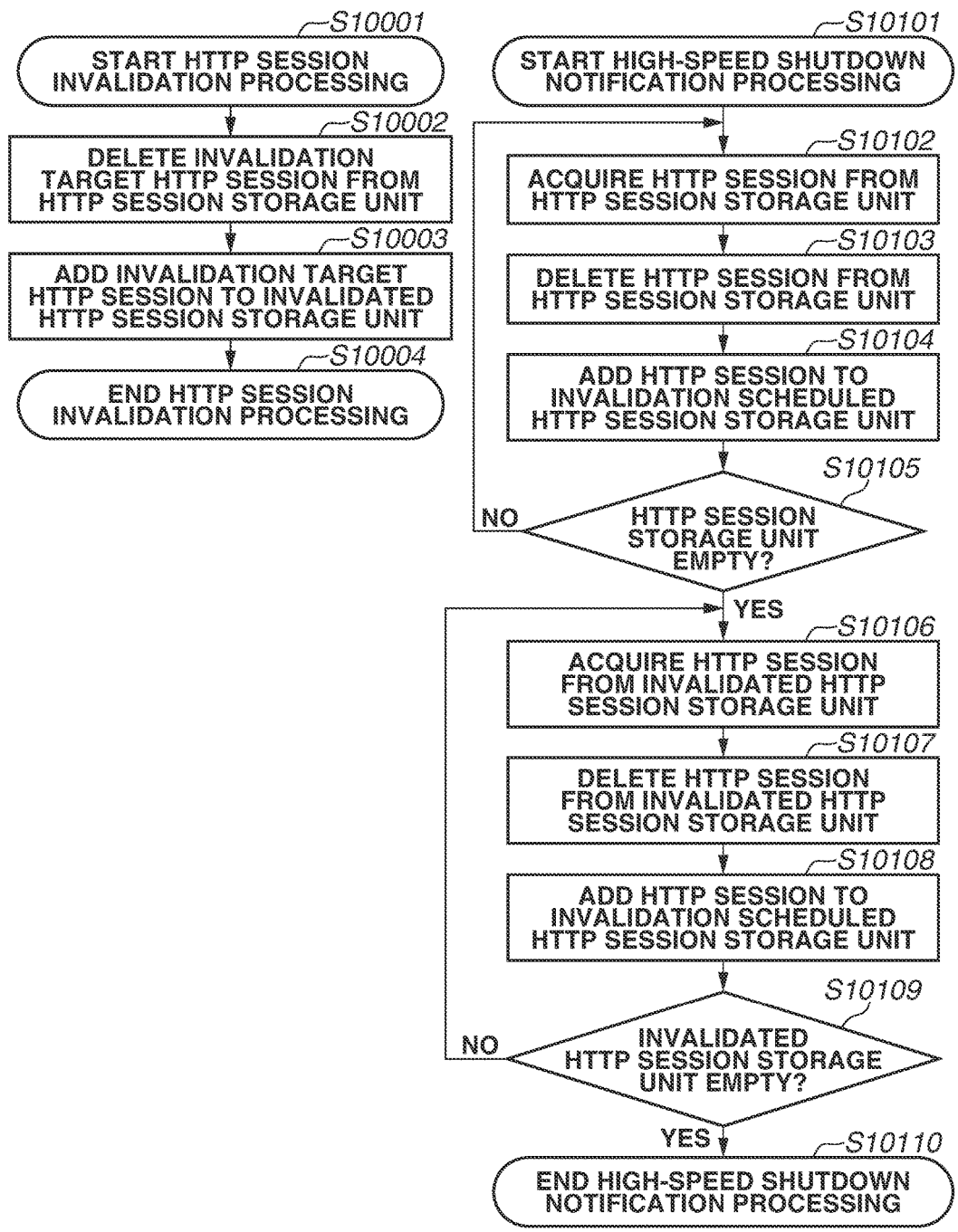

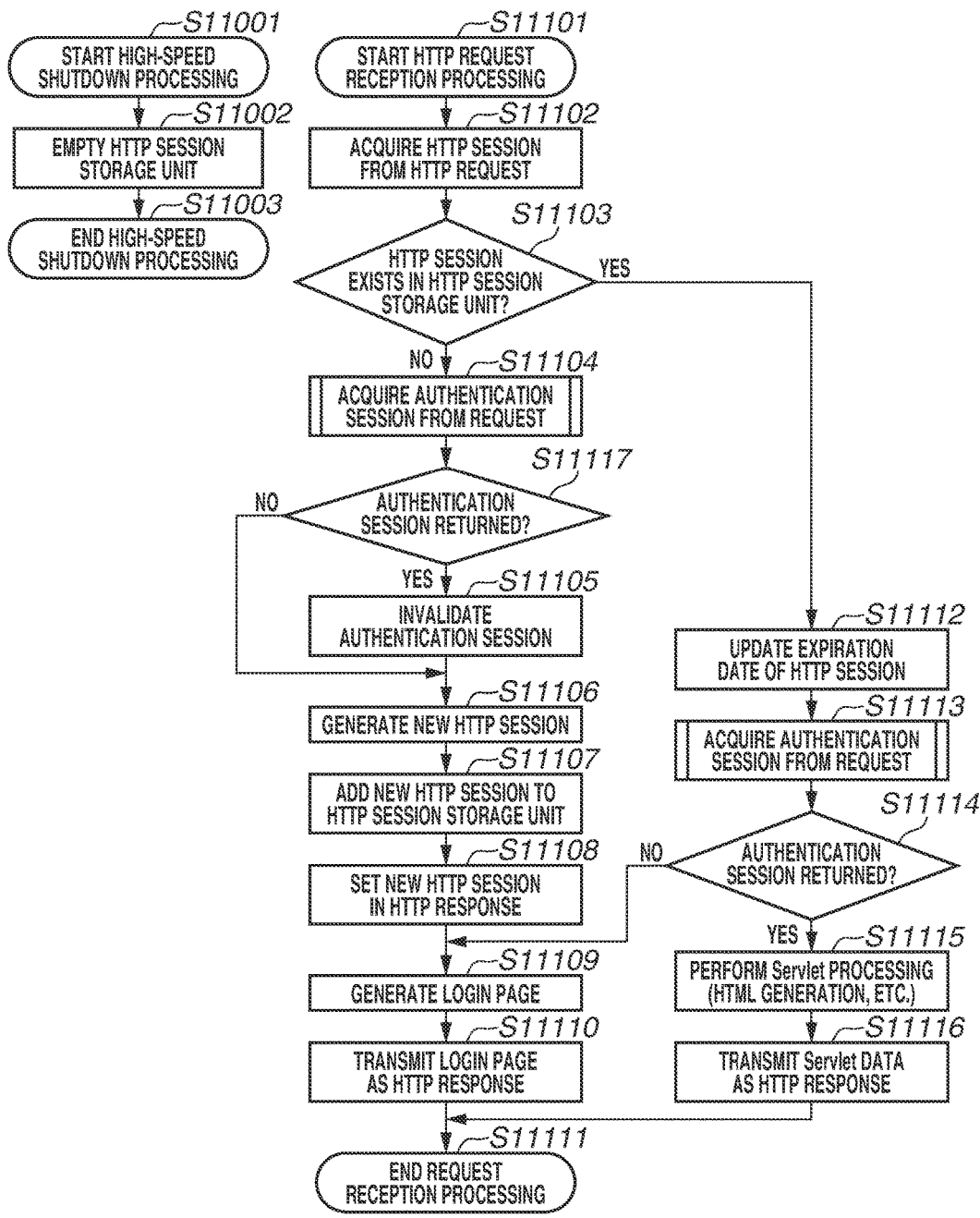

INFORMATION PROCESSING APPARATUS, CONTROL METHOD, AND STORAGE MEDIUM CAPABLE OF TRANSITION TO A POWER SAFE MODE

BACKGROUND

Field of the Disclosure

The present disclosure relates to an information processing apparatus that can transition to a power save mode, a control method, and a storage medium.

Description of the Related Art

As a power save mode of a certain apparatus, the apparatus enters a power saving state in which power supply to at least some hardware resources such as a scanner and a printer is stopped, and a central processing unit (CPU) is stopped while maintaining at least part of memory contents. Hereinafter, this power saving state is referred to as a deep sleep mode, and transitioning of the apparatus to the deep sleep mode is referred to as entering a deep sleep.

The apparatus enters a deep sleep when the apparatus is not operated during a long period of time. The apparatus may also enter a deep sleep upon pressing of a power switch by a user. The apparatus enters a deep sleep and returns from the deep sleep to achieve a high-speed shutdown for performing a shutdown operation more quickly than a normal shutdown and to achieve a high-speed startup for performing a startup operation more quickly than a normal startup.

As a technique relating to a high-speed shutdown, Japanese Patent Application Laid-Open No. 2014-106835 discusses a technique in which, when a user presses a power switch, an apparatus performs either a normal shutdown or a high-speed shutdown after confirming network communication conditions.

SUMMARY

According to an aspect of the present disclosure, an information processing apparatus having at least two services including a login service configured to perform authentication processing based on received authentication information and issues authentication identification information according to a validity of the authentication information, and a communication service configured to issue, upon reception of a first request from an external apparatus, communication identification information and transmit the communication identification information to the external apparatus together with a response and, upon reception of a request including the communication identification information, confirm the authentication identification information included in the request and transmit a response to the external apparatus, includes a transition unit configured to, upon reception of a shutdown instruction, make a state transition to a power saving state where a power supply to a hardware resource of the information processing apparatus is stopped, without deleting information stored in a memory of the information processing apparatus, and a storage unit configured to, when the transition unit makes a state transition to the power saving state, store the issued communication identification information in the memory as invalidation scheduled communication identification information, wherein, after returning from the power saving state, in a case where the communication identification information included in the request received from the external apparatus coincides with the invalidation scheduled communication identification information stored by the storage unit, the communication service transmits to the login service a request for invalidating the authentication identification information included in the request received from the external apparatus and transmits a response for requesting the authentication information to the external apparatus.

Further features of the present disclosure will become apparent from the following description of exemplary embodiments with reference to the attached drawings.

BRIEF DESCRIPTION OF THE DRAWINGS

FIG. 2 illustrates an authentication session storage unit, a Hypertext Transfer Protocol (HTTP) session storage unit, and an invalidation scheduled HTTP session storage unit according to a first exemplary embodiment.

FIG. 3 is a sequence diagram illustrating login processing according to a first exemplary embodiment.

FIG. 4 is a sequence diagram illustrating a high-speed shutdown according to a first exemplary embodiment.

FIG. 5 is a sequence diagram illustrating processing preformed when a request is transmitted from a web browser according to a first exemplary embodiment.

FIG. 6 is a sequence diagram illustrating a logout request according to a first exemplary embodiment.

FIGS. 7A and 7B illustrate state transitions of session storage units according to a first exemplary embodiment.

FIG. 8 is a block diagram illustrating a software configuration according to a second exemplary embodiment.

FIG. 9 (consisting of FIGS. 9A and 9B) is a sequence diagram illustrating HTTP session invalidation processing by a servlet.

FIG. 10 is a flowchart illustrating HTTP session invalidation processing and high-speed shutdown notification processing by the servlet according to a second exemplary embodiment.

FIG. 11 is a flowchart illustrating high-speed shutdown processing and HTTP request reception processing according to a third exemplary embodiment.

DESCRIPTION OF THE EMBODIMENTS

When a user operates a power switch, a high-speed shutdown or a high-speed startup is performed. However, the user may not recognize that the apparatus achieves high-speed operations based on a high-speed shutdown through a deep sleep and a startup through a return from the deep sleep.

It is assumed that, during a deep sleep, the CPU of the apparatus is temporarily stopped and at least part of memory contents is retained without being erased. Therefore, the state of a program operating on the apparatus is identical before the apparatus enters a deep sleep and after the apparatus returns from the deep sleep. For example, authentication identification information indicating the user's login state for a communication service provided in the apparatus will be retained when the apparatus returns from a deep sleep. Therefore, the apparatus allows the user to keep logging in the communication service without performing re-login processing after a high-speed startup. Because the user who specified a shutdown thinks that an authentication session has been reset, the user may possibly distrust the apparatus from the viewpoint of security.

The present disclosure provides a mechanism for invalidating the authentication identification information, issued by the apparatus before entering a high-speed shutdown, when the apparatus returns from the high-speed shutdown. This mechanism maintains security in an apparatus having a power save mode for retaining at least part of memory contents.

The present disclosure makes it possible to maintain security in an apparatus having a power save mode for retaining at least part of memory contents.

Figure 1:
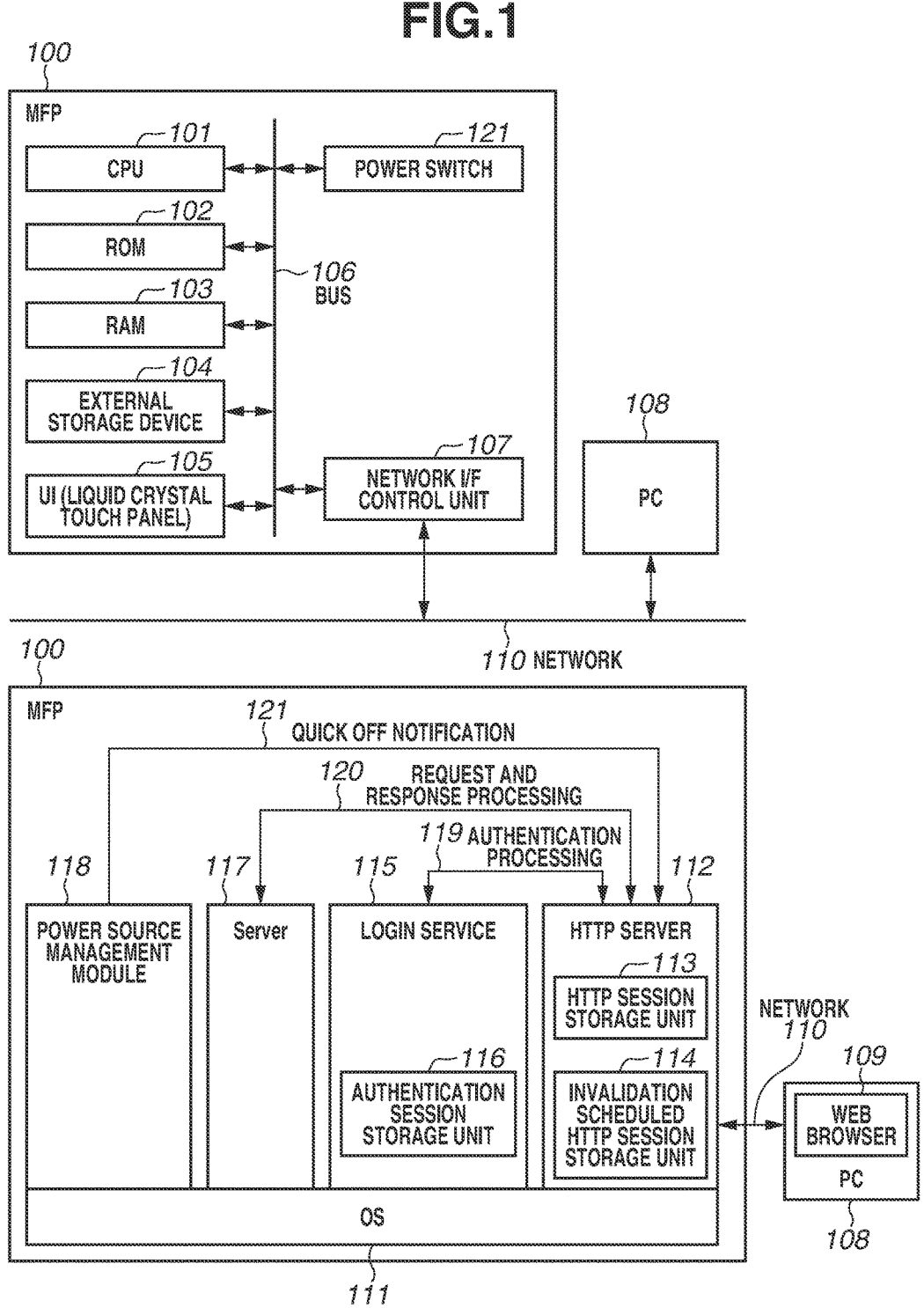
FIG. 1 is a block diagram illustrating a system and a software configuration according to an exemplary embodiment of the present disclosure.

FIG. 1 is a block diagram illustrating a system and a software configuration according to a first exemplary embodiment. This system includes a multifunction peripheral (MFP) 100 serving as an information processing apparatus, and a personal computer (PC) 108 also serving as an information processing apparatus connected via a network 110. The MFP 100 includes a CPU 101 for executing software for achieving the present disclosure, a read only memory (ROM) 102 for storing software for achieving the present disclosure, a random access memory (RAM) 103 for executing software for achieving the present exemplary embodiment, an external storage 104 for storing data by means of software for achieving the present exemplary embodiment, a user interface (UI) 105 on which the user performs an operation, and a network interface (I/F) control unit 107. The UI 105 is implemented as a liquid crystal touch panel or a combination of a liquid crystal panel and hardware keys. The above-described modules are connected with each other via a bus 106 to exchange data. The MFP 100 is connected to the network 110 via the network I/F control unit 107.

A power switch 121 is used by the user to turn power ON and OFF. When the user presses the power switch 121, the MFP 100 performs a startup, a shutdown, a high-speed startup, or a high-speed shutdown. The MFP 100 is provided with such hardware resources as a print engine and a scanner engine (not illustrated). When the MFP 100 performs a high-speed shutdown, power supply to the hardware resources is stopped. The print engine is an engine for printing image data onto a recording sheet, and the scanner engine is an engine for electronically reading a recording sheet and converting the read data into an image.

The PC 108 is connected to the network 110 and includes a CPU, a ROM, a RAM, an external storage device, and a network I/F control unit (not illustrated). A web browser 109 is operating on the PC 108. Using the web browser 109, the user accesses a Hypertext Transfer Protocol (HTTP) server 112 (described below), receives a web UI, and performs setting on the MFP 100 and printing via the web UI.

An operating system (OS) 111, the HTTP server 112, a login service 115, a servlet 117, and a power source management module 118 are pieces of software stored in the ROM 102 of the MFP 100. When the MFP 100 is activated, the software is loaded into the RAM 103 and then executed by the CPU 101. These pieces of software execute sequences and flowcharts (described below).

The OS 111 is basic software for offering hardware functions to applications operating on the OS 111. The HTTP server 112 is a communication service for performing HTTP-based communication, and has a server function of receiving an HTTP request from the web browser 109 through the network 110. The first exemplary embodiment employs the HTTP server 112 for performing HTTP-based communication as a communication service. The HTTP server 112 analyzes the received HTTP request, and requests the login service 115 for authentication processing. The HTTP server 112 further analyzes a received HTTP request and requests the servlet 117 for processing. The HTTP server 112 further transmits processing results of the login service 115 and the servlet 117 and to the web browser 109 as an HTTP response.

The HTTP server 112 includes an HTTP session storage unit 113 for performing session management of HTTP communication, and an invalidation scheduled HTTP session storage unit 114 for storing issued HTTP sessions before performing a high-speed shutdown. Although, in the first exemplary embodiment, the HTTP session storage unit 113 and the invalidation scheduled HTTP session storage unit 114 are described to be different storage units, the HTTP session storage unit 113 may include an invalidation scheduling flag for session management.

The login service 115 is a module for performing user authentication, and checks whether input authentication information is valid authentication information which coincides with preregistered authentication information. The login service 115 generates a login page for allowing the user to log in by using the web browser 109, and determines whether the authentication information transmitted from the web browser 109 is effective authentication information. When the authentication information is valid authentication information and the user can log in, the login service 115 issues an authentication session Cookie and an authentication session. According to the request from the HTTP server 112, the login service 115 determines whether the authentication session included in the HTTP request transmitted from the web browser 109 is effective. The login service 115 includes an authentication session storage unit 116 that stores authentication information of the user who is currently logging in.

The servlet 117 is one of application services, and performs processing for generating a HTML as web UI screen information and processing specified via a web UI according to the request from the HTTP server 112, and transmits the processing results to the HTTP server 112.

The power source management module 118 performs high-speed shutdown processing, high-speed startup processing, shutdown processing, or start processing when the user presses the power switch 121. While the MFP 100 is operating, the power source management module 118 determines whether to perform a high-speed shutdown or a shutdown when the user presses the power switch 121. For example, the power source management module 118 determines whether the user has made setting that requires restarting, such as IP address setting. If the user has made such setting that requires restarting, the power source management module 118 performs the normal shutdown processing. If restarting is not required, the power source management module 118 performs the high-speed shutdown processing.

When the user presses the power switch 121 in a state where a high-speed shutdown has been performed on the MFP 100, the power source management module 118 performs high-speed startup processing. When the user presses the power switch 121 in a state where a normal shutdown has been performed on the MFP 100, the power source management module 118 performs startup processing. Further, when a high-speed shutdown is performed through a user operation, the power source management module 118 notifies the HTTP server 112 of execution of a high-speed shutdown.

FIG. 2 illustrates data stored in the authentication session storage unit 116, the HTTP session storage unit 113, and the invalidation scheduled HTTP session storage unit 114. A Cookie is identification information used to specify arbitrary information received by a specific communication apparatus is related to which session when arbitrary information is exchanged between two different communication apparatuses. Data contents of a session will be described in detail below. A session refers to information used until the end of arbitrary information exchange in a specific connection out of many connections established between communication apparatuses. In the present exemplary embodiment, an HTTP session Cookie is used as communication identification information for identifying a session between the web browser 109 and the HTTP server 112.

First, the HTTP session Cookie is transmitted from the HTTP server 112 to the web browser 109. The web browser 109 stores the HTTP session Cookie for each connection target HTTP server. When the web browser 109 transmits a request to the HTTP server 112, the web browser 109 transmits the HTTP session Cookie received from the HTTP server 112 to the HTTP server 112. The HTTP server 112 transmits the HTTP session Cookie to the web browser 109 by using an HTTP response header "Set-Cookie". The Set-Cookie header includes a Cookie name, which is the identifier of the HTTP session Cookie, and a Cookie value like "Set-Cookie: LOGINSESSION=AAAAA". In this example, the Cookie name is "LOGINSESSION" and the Cookie value is "AAAAA".

In addition to the HTTP session Cookie, a certain type of Cookie is set in the HTTP response header by the login service 115, such as an authentication session Cookie 201, which is authentication identification information. Similar to the communication identification information, the authentication identification information is identification information used for arbitrary information exchange between two different apparatuses. Further, the servlet 117 can set an arbitrary Cookie in the HTTP response header. More specifically, zero or more Set-Cookie headers can be included in one HTTP response. When the web browser 109 receives one or more Cookies from the HTTP server 112, the web browser 109 stores a set of the Cookie name and the Cookie value. The web browser 109 performs "Set-Cookie header" by using the stored HTTP request header "Cookie", and transmits the set Cookie to the HTTP server 112.

The Cookie header includes at least one set of the Cookie name, which is the identifier of Cookie, and the Cookie value like "Cookie: HTTPSESSION=11111; LOGINSESSION="AAAAA". In this example, the web browser 109 transmits a Cookie having the Cookie name "HTTPSESSION" and the Cookie value "11111", and a Cookie having the Cookie name "LOGINSESSION" and the Cookie value "AAAAA". In other words, the communication identification information and the authentication identification information are transmitted to the HTTP server 112. When the web browser 109 transmits a plurality of Cookies to the HTTP server 112, each set of the Cookie name and the Cookie value is delimited by a semicolon ";".

The authentication session storage unit 116 stores authentication sessions each including a set of the authentication session Cookie 201 and an authentication session 202. The authentication session 202 includes an expiration date 203, a valid flag 210, and authority information. The authentication session Cookie 201 is an identifier for searching for an authentication session in the authentication session storage unit 116. Using the authentication session Cookie included in the HTTP request, as a key, the login service 115 searches for the authentication session corresponding to the HTTP request. The expiration date 203 is the expiration date of the authentication session 202. When the expiration date expires, the authentication session 202 is deleted from the authentication session storage unit 116 by the login service 115. The authority information refers to authority information of the authenticated user, and is used to limit the use of the servlet 117. For example, when a user not having administrator authority uses the servlet 117 to perform an operation as an administrator, the authority information is used to return an authority error.

The HTTP session storage unit 113 stores HTTP sessions each including a set of an HTTP session Cookie 204 and an HTTP session 205. The HTTP session 205 includes an expiration date 206. The HTTP session Cookie 204 is an identifier for searching for an HTTP session in the HTTP session storage unit 113. Using the HTTP session Cookie included in the HTTP request, as a key, the HTTP server 112 searches for the HTTP session corresponding to the HTTP request. The expiration date 206 is the expiration date of the HTTP session 205. When the expiration date expires, the HTTP session 205 is deleted from the HTTP session storage unit 113 by the HTTP service 112.

The invalidation scheduled HTTP session storage unit 114 stores HTTP sessions each including a set of an HTTP session Cookie 207 and an HTTP session 208. The HTTP session 208 includes an expiration date 209. The HTTP session Cookie 207 is an identifier for searching for an HTTP session in the invalidation scheduled HTTP session storage unit 114. Using the HTTP session Cookie included in the HTTP request, as a key, the HTTP server 112 searches for the HTTP session corresponding to the HTTP request. The expiration date 209 is the expiration date of the HTTP session 208. When the expiration date expires, the HTTP session 208 is deleted from the invalidation scheduled HTTP session storage unit 114 by the HTTP server 112.

FIG. 3 is a sequence diagram illustrating processing during a login operation. In step S3001, the HTTP server 112 receives a login page request 3101 from the web browser 109 and analyzes the login page request 3101 of the HTTP request format. Since the web browser 109 and the HTTP server 112 establish a connection for the first time, the login page request 3101 serves as a first request transmitted from the web browser 109. The first request does not necessarily need to be a login page request.

In step S3002, if the HTTP request is directed to the login service 115, the HTTP server 112 issues a login page request for generating a login page to the login service 115. In step S3003, upon reception of the login page request from the HTTP server 112, the login service 115 generates a login page. In step S3004, the login service 115 returns the generated login page to the HTTP server 112. In step S3005, when the HTTP server 112 establishes a connection with the web browser 109 for the first time, the HTTP server 112 issues an HTTP session. In step S3006, the HTTP server 112 adds the HTTP session to the HTTP session storage unit 113. Each time an HTTP session is invalidated and a session is established with the web browser 109, the HTTP server 112 issues a new HTTP session and performs a login request. Thus, the HTTP server 112 indirectly associates the HTTP session with the authentication session.

In step S3007, the HTTP server 112 sets the value of the HTTP session Cookie of the issued HTTP session in the Set-Cookie header of an HTTP response 3102. Although, according to the first exemplary embodiment, a Cookie is used as identification information for HTTP session and authentication session information exchange, a parameter of a request Uniform Resource Locator (URL) or a dedicated HTTP header may be used depending on the implementations of the HTTP server 112 and the login service 115. In step S3008, the HTTP server 112 transmits the login page generated by the login service 115 to the web browser 109 as the response body of the HTTP response 3102.

The web browser 109 receives and displays the login page, which is screen information. In step S3009, when the user inputs a login ID and a password as authentication information in the displayed login page and then performs a login operation, the web browser 109 transmits an HTTP request 3103 as a login request. The request body of the HTTP request 3103 includes information required for login, such as the user ID and the password. The information required for login included in the request body is determined by the specifications of the login service 115. Upon reception of the login request 3103 in the HTTP format from the web browser 109, the HTTP server 112 analyzes the HTTP request. In step S3010, if the HTTP request is directed to the login service 115, the HTTP server 112 requests the login service 115 for login.

Figure 12:
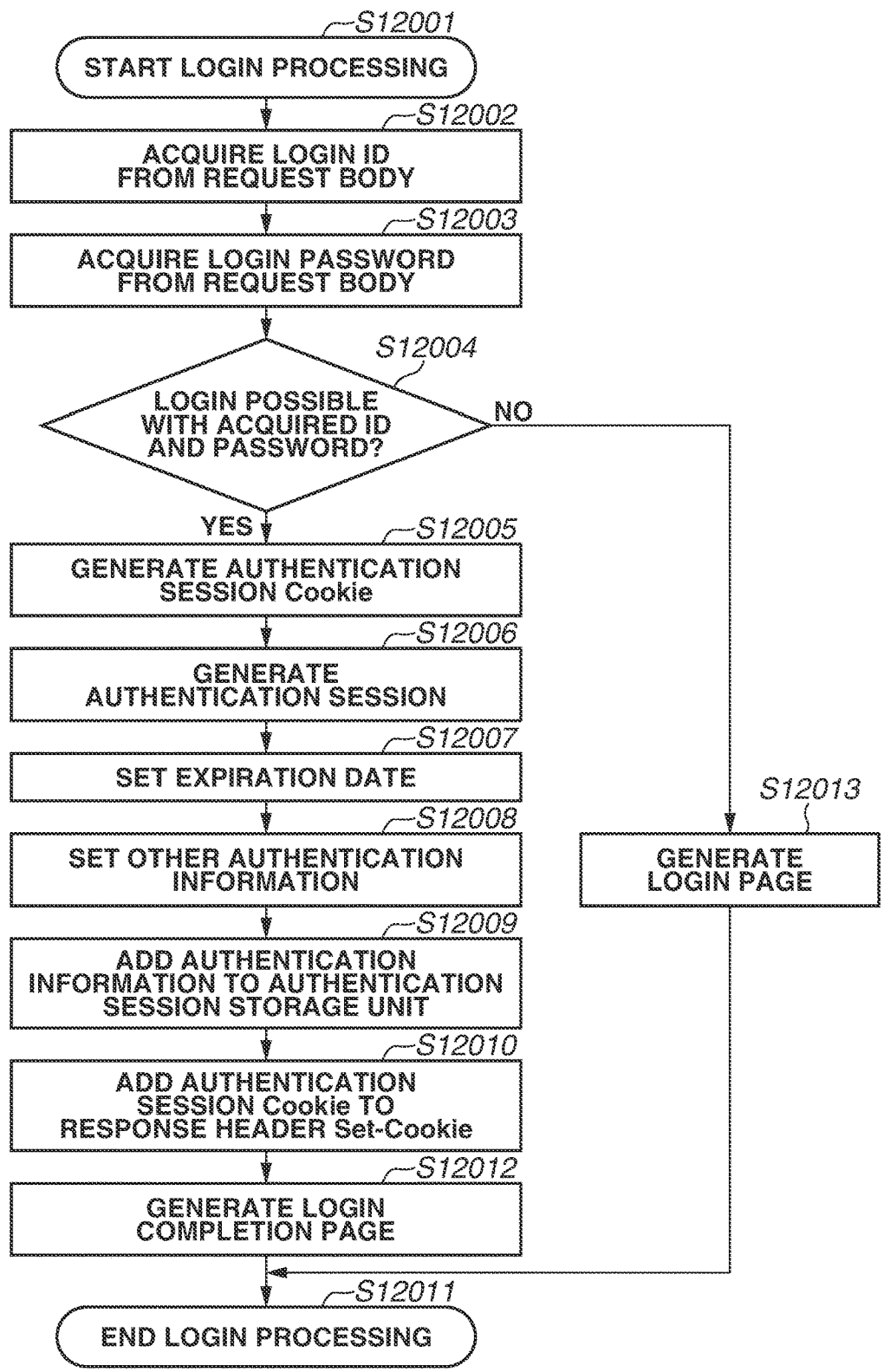
FIG. 12 is a flowchart illustrating login processing according to a first exemplary embodiment.

In step S3011, upon reception of the login request from the HTTP server 112, the login service 115 performs login processing. The execution sequence of the login processing will be described below with reference to FIG. 12. In step S12001, the login service 115 starts the login processing. In step S12002, the login service 115 acquires the login ID from the request body. In step S12003, the login service 115 acquires the login password from the request body.

In step S12004, the login service 115 determines whether login is possible by using the login ID acquired in step S12002 and the login password acquired in step S12003. When login is possible (YES in step S12004), the processing proceeds to step S12005. On the other hand, when login is not possible (NO in step S12004), the processing proceeds to step S12013. In step S12013, the login service 115 returns a login page to the HTTP server 112 as a response (step S3013). In step S12011, the login service 115 ends the login processing.

In step S12005, the login service 115 generates an authentication session Cookie. In step S12006, the login service 115 generates an authentication session. In step S12007, the login service 115 sets the expiration date to the generated authentication session 3014. In step S12008, the login service 115 sets other information such as the user's authority to the authentication session 3014. In step S12009, the login service 115 adds the authentication session Cookie generated in step S12005 and the authentication session generated in step S12006 to the authentication session storage unit 116. In step S12010, the login service 115 sets the value of the authentication session Cookie generated in step S12005 to "Set-Cookie" of the response header. In step S12012, the login service 115 generates a login completion page as the response body. In step S12011, the login service 115 ends the login processing. Although, according to the first exemplary embodiment, the login service 115 acquires a login ID and a login password, the login service 115 may acquire other information because the type of information to be used depends on the specifications of the login service 115. In step S3013, the HTTP server 112 receives an HTTP response 3104 from the login service 115. In step S3014, the HTTP server 112 returns the HTTP response 3104 to the web browser 109.

Figure 13:
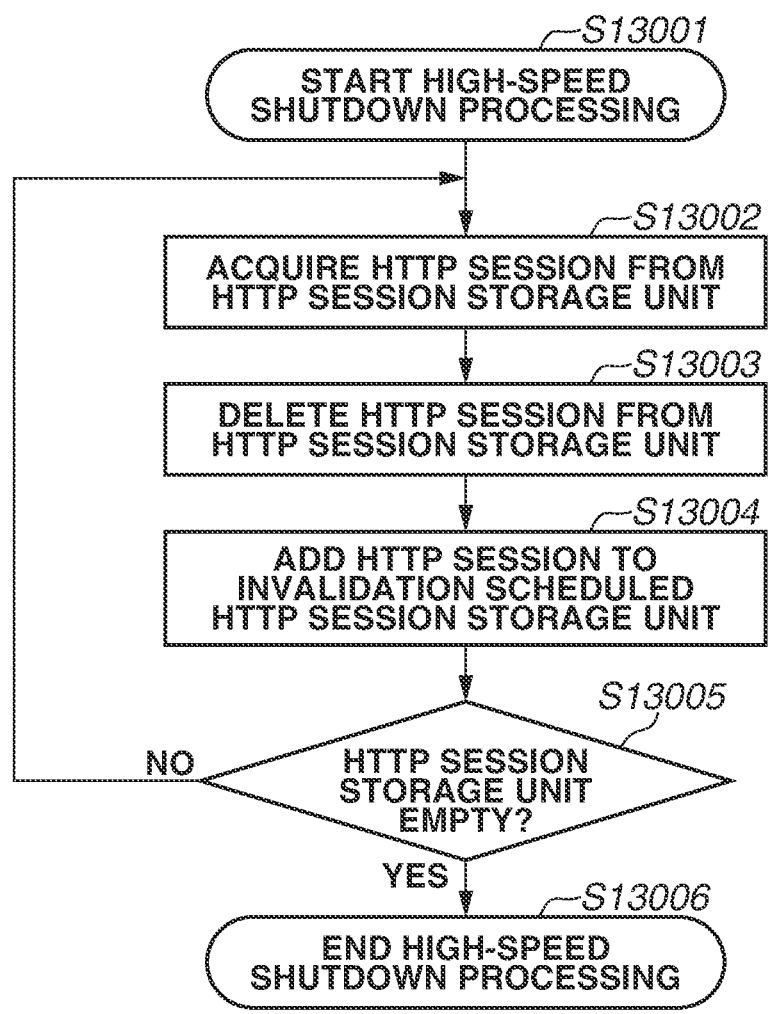
FIG. 13 is a flowchart illustrating processing of an HTTP server at a time of a high-speed shutdown according to a first exemplary embodiment.

FIG. 4 is a sequence diagram illustrating processing performed when the user presses the power switch 121 to start a high-speed shutdown. When the user presses the power switch 121, the power source management module 118 determines whether to perform a high-speed shutdown or to perform a shutdown depending on the current state of the MFP 100. In step S4001, when the power source management module 118 determines to start a high-speed shutdown, the power source management module 118 transmits a high-speed shutdown notification to the HTTP server 112. The processing flow performed when the HTTP server 112 receives the high-speed shutdown notification will be described below with reference to FIG. 13.

In step S13001, upon reception of the high-speed shutdown notification, the HTTP server 112 starts the high-speed shutdown processing. In step S13002, the HTTP server 112 acquires one issued HTTP session from the HTTP session storage unit 113. In step S13003, the HTTP server 112 deletes the issued HTTP session acquired in step S13002 from the HTTP session storage unit 113. In step S13004, the HTTP server 112 adds the issued HTTP session acquired in step S13002 to the invalidation scheduled HTTP session storage unit 114. In step S13005, the HTTP server 112 determines whether the HTTP session storage unit 113 is empty. When the HTTP session storage unit 113 is empty (YES in step S13005), the processing proceeds to step S13006. In step S13006, the HTTP server 112 ends the high-speed shutdown processing. In step S4002, the HTTP server 112 returns control to the power source management module 118.

When the HTTP session storage unit 113 is not empty (NO in step S13005), the processing returns to step S13002. In steps S13002 to S13004, the HTTP server 112 repetitively performs the processing for adding another issued HTTP session to the invalidation scheduled HTTP session storage unit 114. Thus, at the time of a high-speed shutdown, all of the issued HTTP sessions will be deleted and then added to the invalidation scheduled HTTP session storage unit 114. Even after a high-speed shutdown operation is performed and the power supply to the hardware resources including the print engine included in the MFP 100 is stopped, at least part of data including data in the invalidation scheduled HTTP session storage unit 114 is not deleted.

Figure 14A:
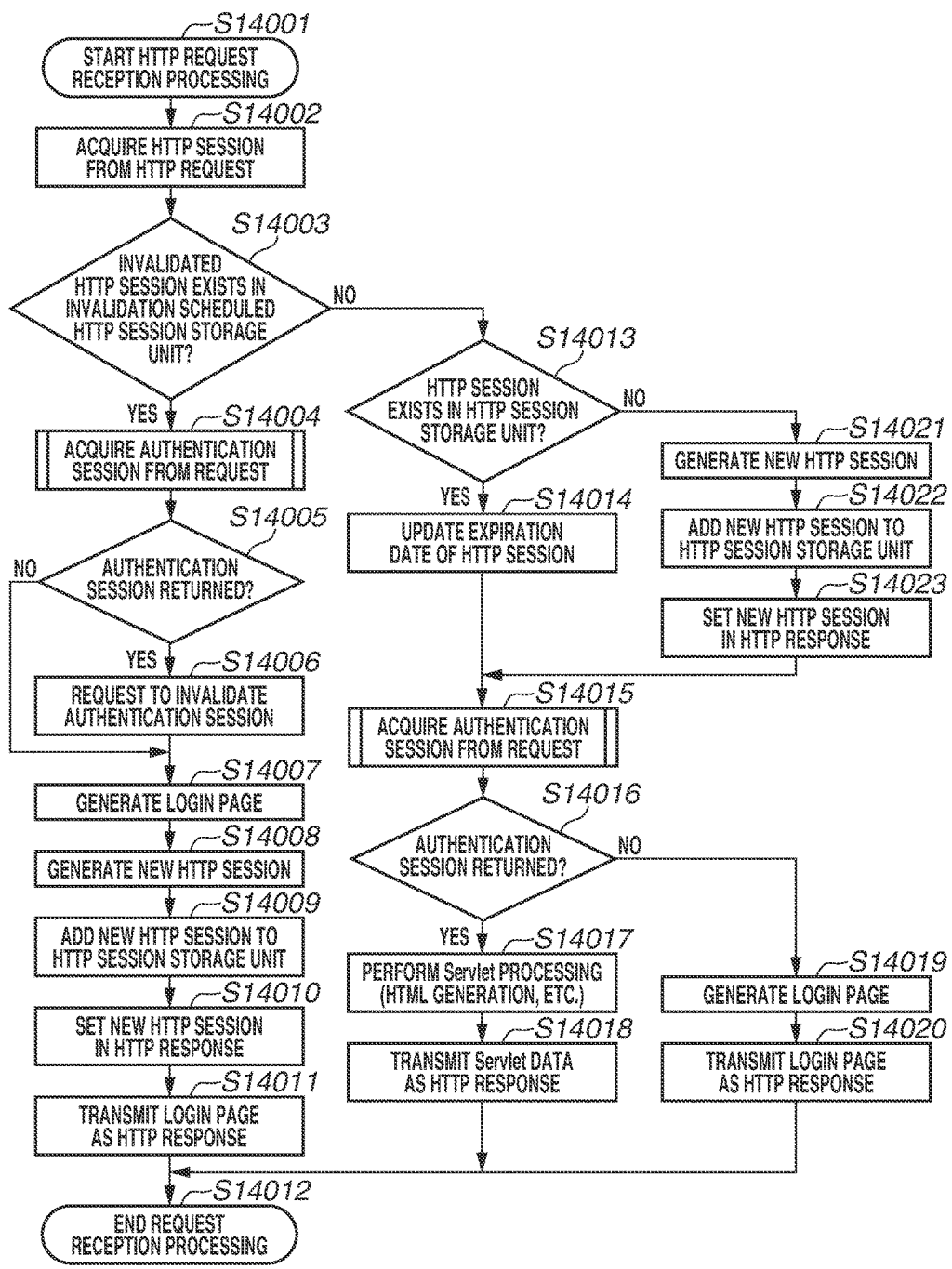
FIGS. 14A and 14B are flowcharts illustrating processing performed when a request is transmitted from the web browser according to a first exemplary embodiment.

FIG. 5 is a sequence diagram illustrating processing performed when the web browser 109 transmits a request to the web UI with respect to the HTTP server 112. The sequence illustrated in FIG. 5 is performed, after completion of the login sequence illustrated in FIG. 3 and the high-speed shutdown illustrated in FIG. 4, when the user presses the power switch 121 and the MFP 100 performs a high-speed startup. In step S5001, the web browser 109 transmits a request to the web UI with respect to the HTTP server 112. The Cookie header of an HTTP request 5101 includes the HTTP session Cookie for identifying an HTTP session and the authentication session Cookie for identifying an authentication session. The processing flow performed by the HTTP server 112 that has received the HTTP request 5101 will be described below with reference to FIGS. 14A and 14B.

In step S14001, upon reception of the HTTP request 5101 from the web browser 109, the HTTP server 112 starts HTTP request reception processing. In step S14002, the HTTP server 112 acquires the HTTP session Cookie from the Cookie header of the HTTP request 5101. In steps S5002 and S14003, the HTTP server 112 determines whether an HTTP session invalidated in the high-speed shutdown exists in the invalidation scheduled HTTP session storage unit 114 by using the HTTP session Cookie acquired in step S1402, as a key. When such an HTTP session exists (YES in step S14003), the processing proceeds to step S14004. In step S13006, the HTTP server 112 ends the high-speed shutdown processing. On the other hand, when such as HTTP session does not exist (NO in step S14003), the processing proceeds to step S14013. In step S5003, the HTTP server 112 requests the login service 115 for an authentication session. Processing in steps S14004 to S14011 is performed, after a high-speed shutdown is performed in a state where the user logs in, when a high-speed startup is performed and the web browser 109 transmits a request to the web UI with respect to the HTTP server 112.

In steps S5004 and S14004, the login service 115 searches for an authentication session 5102 in the authentication session storage unit 116 by using the value of the authentication session Cookie of the Cookie header of the HTTP request 5101 as a key, and acquires the authentication session 5102. In step S5005, when the login service 115 can acquire the authentication session 5102, the login service 115 returns the authentication session 5102 to the HTTP server 112. On the other hand, when the login service 115 cannot acquire the authentication session 5102, the login service 115 returns a response indicating no authentication session to the HTTP server 112. In step S14005, the HTTP server 112 checks whether an authentication session has been returned from the login service 115. When an authentication session has been returned (YES in step S14005), the processing proceeds to step S14006. On the other hand, when a response indicating no authentication session has been returned (NO in step S14005), the processing proceeds to step S14007. A response indicating no authentication session is returned in a case where the expiration date of an authentication session expires before reception of the HTTP request 5101, and the authentication session has been deleted from the authentication session storage unit 116 by the login service 115.

In steps S5006 and S14006, the HTTP server 112 requests the login service 115 to invalidate the acquired authentication session. As a method for requesting invalidation, the HTTP server 112 may transmit the authentication session Cookie of the invalidation target authentication session to the login service 115, the method is not limited thereto. In step S5007, to invalidate the invalidation target authentication session, the login service 115 deletes the authentication session from the authentication session storage unit 116. When the authentication session is deleted from the authentication session storage unit 116, the HTTP server 112 cannot acquire an authentication session even if the authentication session Cookie of the deleted authentication session is included in an HTTP request received by the HTTP server 112. In this case, therefore, the user operating the web browser 109 that has transmitted the HTTP request needs to perform a login operation again. In step S5008, the login service 115 returns control to the HTTP server 112.

In step S5009, the HTTP server 112 requests the login service 115 to generate a login page. In steps S5010 and S14007, the login service 115 generates a login page. In step S5011, the login service 115 returns the login page to the HTTP server 112. In steps S5012 and S14008, the HTTP server 112 generates a new HTTP session. In step S14009, the HTTP server 112 adds the new HTTP session to the HTTP session storage unit 113. In step S14010, the HTTP server 112 sets in the response a response header "Set-Cookie" 5103 having the value of the HTTP session Cookie. In steps S5013 and S14011, the HTTP server 112 transmits the login page to the web browser 109 as an HTTP response.

In step S14012, the HTTP server 112 ends the HTTP request reception processing. In step S14013, the HTTP server 112 determines whether an HTTP session exists in the HTTP session storage unit 113 by using the HTTP session Cookie acquired in step S14002, as a key. When an HTTP session exists (YES in step S14013), the processing proceeds to step S14014. On the other hand, when an HTTP session does not exist (NO in step S14013), the processing proceeds to step S14021. In step S14014, the HTTP server 112 updates the expiration date of the HTTP session stored in the HTTP session storage unit 113 to the value acquired by adding the lifetime of the HTTP session to the present time. The lifetime of the HTTP session is predetermined by the HTTP server 112.

Then, the HTTP server 112 requests the login service 115 for an authentication session. In step S14015, the login service 115 acquires an authentication session. If the login service 115 can acquire an authentication session in step S14015, the login service 115 returns the authentication session to the HTTP server 112. On the other hand, if the login service 115 cannot acquire an authentication session in step S14015, the login service 115 returns a response indicating no authentication session. In step S14016, the HTTP server 112 checks whether an authentication session has been returned from the login service 115. When an authentication session has been returned (YES in step S14016), the processing proceeds to step S14017. On the other hand, when a response indicating no authentication session has been returned (NO in step S14016), the processing proceeds to step S14019. A response indicating no authentication session is returned in a case where the expiration date of the authentication session has expired before the HTTP server 112 receives an HTTP request.

In step S14017, the HTTP server 112 requests the servlet 117 for the servlet processing, and the servlet 117 performs the servlet processing including processing for generating HTML. In step S14018, the HTTP server 112 transmits the HTML data generated by the servlet 117 to the web browser 109 as an HTTP response. In step S14012, the HTTP server 112 ends the HTTP request reception processing.

In step S14021, when no HTTP session exists in the HTTP session storage unit 113, the HTTP server 112 generates a new HTTP session. In step S14022, the HTTP server 112 adds the new HTTP session to the HTTP session storage unit 113. In step S14023, the HTTP server 112 sets in the response the response header "Set-Cookie" having the value of the HTTP session Cookie of the HTTP session generated in step S14021. The HTTP server 112 performs processing in this flowchart. This means that the HTTP server 112 confirms that there is no authentication session in step S14016 because the HTTP server 112 receives a request from the web browser 109 for the first time. In step S14019, the HTTP server 112 requests the login service 115 to generate a login page, and the login service 115 generates a login page and returns the login page to the HTTP server 112. In step S14020, the HTTP server 112 transmits the login page to the web browser 109 as an HTTP response. In step S14012, the HTTP server 112 ends the HTTP request reception processing.

The acquisition of an authentication session will be described in detail below. In step S14101, when the login service 115 receives an authentication session request from the HTTP server 112, the login service 115 starts authentication session acquisition processing. In step S14102, the login service 115 acquires the authentication session Cookie from the Cookie header of the HTTP request. In step S14103, the login service 115 determines whether the authentication session Cookie has been acquired. When the authentication session Cookie has been acquired (YES in step S14103), the processing proceeds to step S14104. On the other hand, when the authentication session Cookie has not been acquired (NO in step S14103), the processing proceeds to step S14109. In step S14104, the login service 115 searches for an authentication session in the authentication session storage unit 116 by using the acquired authentication session Cookie as a key. When an authentication session exists (YES in step S14104), the login service 115 acquires the authentication session, and the processing proceeds to step S14105. On the other hand, when the login service 115 cannot acquire the authentication session (NO in step S14104), the processing proceeds to step S14109.

In step S14105, the login service 115 checks the expiration date of the acquired authentication session. When the expiration date of the acquired authentication session has not expired (current date is before the expiration date) (YES in step S14105), the processing proceeds to step S14106. On the other hand, when the expiration date of the acquired authentication session has expired (current date is not before the expiration date) (NO in step S14105), the processing proceeds to step S14109. In step S14106, the login service 115 updates the expiration date of the acquired authentication session to the value acquired by adding the lifetime of the authentication session to the present time. The lifetime of an authentication session is predetermined by the login service 115. When the web browser 109 transmits the next HTTP request within the lifetime of an authentication session, the expiration date of the authentication session is updated and therefore becomes longer than the lifetime thereof. In step S14107, the login service 115 transfers the acquired authentication session to the HTTP server 112. In step S14108, the login service 115 ends the authentication session acquisition processing. In step S14109, the login service 115 returns a response indicating no authentication session to the HTTP server 112. In step S14108, the login service 115 ends the authentication session acquisition processing.

A session will be described in detail below. AN HTTP session has an expiration date. The HTTP server 112 deletes an HTTP session the expiration date of which has expired from the HTTP session storage unit 113 and the invalidation scheduled HTTP session storage unit 114. Likewise, an authentication session has an expiration date. The login service 115 deletes an authentication session the expiration date of which has expired from the authentication session storage unit 116. To improve security of the MFP 100, it is assumed that the lifetime of an authentication session is shorter than the lifetime of an HTTP session predetermined by the HTTP server 112. An HTTP session is maintained for a time period as long as possible taking user's convenience into consideration. On the other hand, an authentication session needs to be invalidated within a time period as short as possible to improve security. For example, the lifetime of an HTTP session is about 30 minutes to 1 hour while the lifetime of an authentication session is about 1 to 5 minutes.

When the HTTP server 112 receives a request including the HTTP session Cookie and the authentication session Cookie from the web browser 109, the HTTP server 112 updates the expiration date of the HTTP session and the expiration date of the authentication session corresponding to respective Cookies. At the same time, the login service 115 updates the expiration date of the authentication session. Therefore, if no HTTP request is received for a predetermined time period, the expiration date of the authentication session expires first.

The login service 115 can invalidate an authentication session by receiving a logout request from the web browser 109. FIG. 6 is a sequence diagram illustrating processing performed when a logout request is transmitted from the web browser 109. In step S6001, the web browser 109 transmits an HTTP request 6101 to the HTTP server 112. The request URL in the HTTP request 6101 is a URL that indicates a logout. The Cookie header includes the value of the authentication session Cookie. In step S6002, when the HTTP server 112 that received the HTTP request 6101 analyzes the request URL to determine the request URL as a logout request, the HTTP server 112 requests the login service 115 for logout.

In step S6003, the login service 115 performs logout processing and deletes from the authentication session storage unit 116 an authentication session having the authentication session Cookie included in the Cookie header of the HTTP request 6101. In step S6004, the login service 115 generates a login page. In step S6005, the login service 115 returns the login page to the HTTP server 112. In step S6006, the HTTP server 112 returns a response 6102 including HTML data of the login page to the web browser 109.

FIG. 7 illustrates state transitions of the authentication session storage unit 116, the HTTP session storage unit 113, and the invalidation scheduled HTTP session storage unit 114 when a timeout of an HTTP session and an authentication session, a logout by the user, a high-speed shutdown, and a high-speed startup are mixedly performed. An arrow 7018 indicates the passage of time, i.e., time progresses from the top downward.

A state 7001 is an initial state 1 where the authentication session storage unit 116, the HTTP session storage unit 113, and the invalidation scheduled HTTP session storage unit 114 are in an initial state. The authentication sessions "AAAAA" and "BBBB" are stored in the authentication session storage unit 116. HTTP sessions "11111" and "22222" are stored in the HTTP session storage unit 113. The invalidation scheduled HTTP session storage unit 114 is empty. The authentication session "AAAAA" and the HTTP session "11111" are assumed to be included in the same HTTP request. A state 7002 indicates the states of the three storage units when a timeout of the authentication session "AAAAA" is performed. The authentication session "BBBB" is stored in the authentication session storage unit 116. The HTTP sessions "11111" and "22222" are stored in the HTTP session storage unit 113. The invalidation scheduled HTTP session storage unit 114 is empty.

A state 7003 indicates the states of the three storage units when, after a passage of time, a timeout of the HTTP session "11111" is performed. The authentication session "BBBBB" is stored in the authentication session storage unit 116. The HTTP session "22222" is stored in the HTTP session storage unit 113. The invalidation scheduled HTTP session storage unit 114 is empty. A state 7004 indicates the states of the three storage units after a high-speed shutdown startup is performed. The authentication session "BBBBB" is stored in the authentication session storage unit 116. The HTTP session storage unit 113 is empty. The HTTP session "22222" is stored in the invalidation scheduled HTTP session storage unit 114. When the HTTP server 112 receives an HTTP request 7005 at this stage, the user needs to newly log in since a timeout of the authentication session "AAAAA" has already occurred.

A state 7006 is an initial state 2 where the authentication session storage unit 116, the HTTP session storage unit 113, and the invalidation scheduled HTTP session storage unit 114 are in an initial state. The authentication sessions "AAAAA" and "BBBBB" are stored in the authentication session storage unit 116. The HTTP sessions "11111" and "22222" are stored in the HTTP session storage unit 113. The invalidation scheduled HTTP session storage unit 114 is empty. The authentication session "AAAAA" and the HTTP session "11111" are assumed to be included in the same HTTP request. A state 7007 indicates the states of the three storage units when, after a passage of time, a timeout of the authentication session "AAAAA" is performed. The authentication session "BBBBB" is stored in the authentication session storage unit 116. The HTTP sessions "11111" and "22222" are stored in the HTTP session storage unit 113. The invalidation scheduled HTTP session storage unit 114 is empty.

A state 7008 indicates the states of the three storage units after a high-speed shutdown startup is performed. The authentication session "BBBBB" is stored in the authentication session storage unit 116. The HTTP session storage unit 113 is empty. The HTTP sessions "11111" and "22222" are stored in the invalidation scheduled HTTP session storage unit 114.

When the HTTP server 112 receives an HTTP request 7009 at this stage, the user needs to newly log in since a timeout of the authentication session "AAAAA" has already occurred.

A state 7010 is an initial state 3 where the authentication session storage unit 116, the HTTP session storage unit 113, and the invalidation scheduled HTTP session storage unit 114 are in an initial state. The authentication sessions "AAAAA" and "BBBBB" are stored in the authentication session storage unit 116. The HTTP sessions "11111" and "22222" are stored in the HTTP session storage unit 113. The invalidation scheduled HTTP session storage unit 114 is empty. A state 7011 indicates the states of the three storage units when a logout is performed by the user. The authentication session "BBBBB" is stored in the authentication session storage unit 116. The HTTP sessions "11111" and "22222" are stored in the HTTP session storage unit 113. The invalidation scheduled HTTP session storage unit 114 is empty.

A state 7012 indicates the states of the three storage units after a high-speed shutdown startup is performed. The authentication session "BBBBB" is stored in the authentication session storage unit 116. The HTTP session storage unit 113 is empty. The HTTP sessions "11111" and "22222" are stored in the invalidation scheduled HTTP session storage unit 114. When the HTTP server 112 receives an HTTP request 7013 at this stage, the user needs to newly log in since a logout of the authentication session "AAAAA" has already been performed.

A state 7014 is an initial state 4 where the authentication session storage unit 116, the HTTP session storage unit 113, and the invalidation scheduled HTTP session storage unit 114 are in an initial state. The authentication sessions "AAAAA" and "BBBBB" are stored in the authentication session storage unit 116. The HTTP sessions "11111" and "22222" are stored in the HTTP session storage unit 113. The invalidation scheduled HTTP session storage unit 114 is empty. A state 7015 indicates the states of the three storage units after a high-speed shutdown startup is performed. The authentication sessions "AAAAA" and "BBBBB" are stored in the authentication session storage unit 116. The HTTP session storage unit 113 is empty. The HTTP sessions "11111" and "22222" are stored in the invalidation scheduled HTTP session storage unit 114.

A state 7016 indicates the states of the three storage units when, after a passage of time, a timeout of the authentication session "AAAAA" is performed. The authentication session "BBBBB" is stored in the authentication session storage unit 116. The HTTP session storage unit 113 is empty. The HTTP sessions "11111" and "22222" are stored in the invalidation scheduled HTTP session storage unit 114. When the HTTP server 112 receives an HTTP request 7017 at this stage, the user needs to newly log in since a timeout of the authentication session "AAAAA" has already occurred.

According to the first exemplary embodiment, it is possible to invalidate authentication sessions generated before a high-speed shutdown by storing HTTP sessions generated before a high-speed shutdown in the invalidation scheduled HTTP session storage unit 114. The above-described configuration enables maintaining security for an apparatus that, upon a power source operation by a user, enters a deep sleep (power saving state) while storing at least part of memory contents to perform a high-speed shutdown.

According to the first exemplary embodiment, when an HTTP session is invalidated by the servlet 117 before performing a high-speed shutdown, the invalidated HTTP session is deleted from the HTTP session storage unit 113. Therefore, an HTTP session invalidated before the MFP 100 performs a high-speed shutdown according to an instruction of the servlet 117 cannot be moved to the invalidation scheduled HTTP session storage unit 114. Therefore, after the MFP 100 performs a high-speed startup, an authentication session indirectly related to the HTTP session invalidated by the servlet 117 cannot be invalidated. As a result, the authentication session remains in the authentication session storage unit 116. Although the authentication session will be deleted due to the passage of time, the servlet 117 may possibly be used in a case where a request is made to the servlet 117, in a certain way before the authentication session is deleted, based on the authentication session that has not been unable to be deleted. A second exemplary embodiment will be described below centering on a method for solving this problem. Units and modules not described in the second exemplary embodiment have similar configurations and operations to those in the first exemplary embodiment.

FIG. 8 illustrates a software configuration according to the second exemplary embodiment. In addition to the software configuration according to the first exemplary embodiment, the HTTP server 112 includes an invalidated HTTP session storage unit 8001. The invalidated HTTP session storage unit 8001 is a storage unit for storing an HTTP session Cookie 8002 and an HTTP session 8003.

FIG. 9 (consisting of FIGS. 9A and 9B) is a sequence diagram illustrating a problem occurring in a case where the servlet 117 is provided with a function of invalidating an HTTP session included in an HTTP request. In step S9001, the web browser 109 transmits an HTTP request 9101 to the HTTP server 112. The HTTP request 9101 includes an HTTP session Cookie for identifying an HTTP session and an authentication session Cookie for identifying an authentication session. After the HTTP server 112 performs the processing illustrated in FIGS. 14A and 14B and acquires an authentication session from the login service 115, the HTTP server 112 analyzes the HTTP request 9101. In step S9002, when the HTTP server 112 determines that the HTTP request 9101 is a request to the servlet 117, the HTTP server 112 requests the servlet 117 for the servlet processing. In step S9003, the servlet 117 requests the HTTP server 112 to invalidate the HTTP session corresponding to the HTTP session Cookie included in the HTTP request 9101. In step S9004, the HTTP server 112 deletes the specified HTTP session from the HTTP session storage unit 113 to invalidate it. In step S9005, after completion of the invalidation of the HTTP session, the HTTP server 112 returns control to the servlet 117. In step S9006, the servlet 117 performs the servlet processing including processing for generating HTML and controlling the MFP 100. Depending on the contents of the servlet processing performed by the servlet 117, steps S9003 and S9006 may be called in a different order or executed a plurality of times.

In step S9007, the servlet 117 transmits the generated HTML to the HTTP server 112. In step S9008, the HTTP server 112 transmits the HTML data generated by the servlet 117 to the web browser 109 as a response. In step S9009, when the user presses the power switch 121 and the power source management module 118 starts a high-speed shutdown in this state, the power source management module 118 notifies the HTTP server 112 of a high-speed shutdown. The HTTP server 112 performs the processing in steps S13001 to S13006 illustrated in FIG. 13 to move HTTP sessions included in the HTTP session storage unit 113 to the invalidation scheduled HTTP session storage unit 114. However, HTTP sessions invalidated by the servlet 117 no longer exist in the HTTP session storage unit 113 and therefore are not moved to the invalidation scheduled HTTP session storage unit 114. In step S9010, the HTTP server 112 returns "high-speed shutdown notification reception completed" to the power source management module 118.

In step S9011, after a high-speed startup, the web browser 109 transmits an HTTP request 9102 to the HTTP server 112. In step S9013, since the HTTP session included in a request 9013 does not exist in the invalidation scheduled HTTP session storage unit 114, the HTTP server 112 cannot invalidate the authentication session included in the request 9102.

FIG. 10 is a flowchart illustrating HTTP session invalidation processing and high-speed shutdown notification processing performed by the servlet 117 to solve the problem illustrated in FIG. 9. Steps S10001 to S10004 form a flowchart of the HTTP session invalidation processing by the servlet 117.

Steps S10101 to S10110 form a flowchart of the high-speed shutdown notification processing. In step S10001, when the servlet 117 requests the HTTP server 112 for the HTTP session invalidation processing, the HTTP server 112 starts the HTTP session invalidation processing. In step S10002, the HTTP server 112 deletes an invalidation target HTTP session specified by the servlet 117 from the HTTP session storage unit 113.

In step S10003, the HTTP server 112 adds the invalidation target HTTP session specified by the servlet 117 to the invalidated HTTP session storage unit 8001. In step S10004, the HTTP server 112 ends the HTTP session invalidation processing. When the user presses the power switch 121 and the power source management module 118 starts a high-speed shutdown, the power source management module 118 transmits a high-speed shutdown notification to the HTTP server 112. In step S10101, upon reception of the high-speed shutdown notification, the HTTP server 112 starts the high-speed shutdown processing. In step S10102, the HTTP server 112 acquires one HTTP session from the HTTP session storage unit 113. In step S10103, the HTTP server 112 deletes the acquired HTTP session from the HTTP session storage unit 113.

In step S10104, the HTTP server 112 adds the HTTP session acquired in step S10102 to the invalidation scheduled HTTP session storage unit 114. In step S10105, the HTTP server 112 determines whether the HTTP session storage unit 113 is empty. When the HTTP session storage unit 113 is empty (YES in step S10105), the processing proceeds to step S10106. On the other hand, when the HTTP session storage unit 113 is not empty (NO in step S10105), the processing returns to step S10102 and the HTTP server 112 continues the processing. In step S10106, the HTTP server 112 acquires one HTTP session from the invalidated HTTP session storage unit 8001. In step S10107, the HTTP server 112 deletes the acquired HTTP session from the invalidated HTTP session storage unit 8001.

In step S10108, the HTTP server 112 adds the HTTP session acquired in step S10106 to the invalidation scheduled HTTP session storage unit 114. In step S10109, the HTTP server 112 determines whether the invalidated HTTP session storage unit 8001 is empty. In step S10110, when the invalidated HTTP session storage unit 8001 is empty (YES in step S10109), the processing proceeds to step S10110. In step S10110, the HTTP server 112 ends the high-speed shutdown processing. On the other hand, when the invalidated HTTP session storage unit 8001 is not empty (NO in step S10109), the processing returns to step S10106 and the HTTP server 112 continues the processing.

Although, in the second exemplary embodiment, the HTTP server 112 once moves the invalidation target HTTP session to the invalidated HTTP session storage unit 8001, the HTTP server 112 may directly store the invalidation target HTTP session in the invalidation scheduled HTTP session storage unit 114. Instead of the invalidated HTTP session storage unit 8001, a field for an HTTP session invalidation flag may be provided in the HTTP session storage unit 113. Upon reception of an HTTP session invalidation request, the HTTP server 112 may set the HTTP session invalidation flag.

Authentication session invalidation processing performed when the web browser 109 requests the HTTP server 112 after a high-speed shutdown startup is similar to that according to the first exemplary embodiment. Even when an application service invalidates an HTTP session, the use of the invalidated HTTP session storage unit 8001 enables invalidating, after a high-speed startup, the authentication session of a user who logged in before a high-speed shutdown.

A third exemplary embodiment, which is an improved version of the first exemplary embodiment, is a method for invalidating an authentication session in a simplified way. The third exemplary embodiment will be described below centering on this invalidation method. Units and modules not described in the third exemplary embodiment have similar configurations and operations to those in the first exemplary embodiment. FIG. 11 is a flowchart illustrating high-speed shutdown processing and HTTP request reception processing according to the third exemplary embodiment. Steps S11001 to S11003 form a flowchart of the high-speed shutdown processing by the HTTP server 112. Steps S10101 to S10110 form a flowchart of processing performed by the HTTP server 112 upon reception of a request from the web browser 109 after a high-speed startup.

When the user presses the power switch 121 and the power source management module 118 starts a high-speed shutdown, the power source management module 118 transmits a high-speed shutdown notification to the HTTP server 112. In step S11001, upon reception of the high-speed shutdown notification, the HTTP server 112 starts the high-speed shutdown processing. In step S11002, the HTTP server 112 empties the HTTP session storage unit 113. In step S11003, the HTTP server 112 ends the high-speed shutdown processing. In step S11101, upon reception of an HTTP request from the web browser 109, the HTTP server 112 starts the HTTP request reception processing. In step S11102, the HTTP server 112 acquires the HTTP session Cookie from the Cookie header of the HTTP request.

In step S11103, the HTTP server 112 checks whether an HTTP session exists in the HTTP session storage unit 113 by using the HTTP session Cookie acquired in step S11102, as a key. When an HTTP session exists (YES in step S11103), the processing proceeds to step S11112. On the other hand, when an HTTP session does not exist (NO in step S11103), the processing proceeds to step S11104. In step S11104, the HTTP server 112 requests the login service 115 for an authentication session, and the login service 115 performs the processing in steps S14101 to S14108 illustrated in FIG. 14B to acquire an authentication session. If the login service 115 can acquire an authentication session, the login service 115 returns the authentication session to the HTTP server 112. On the other hand, if the login service 115 cannot acquire an authentication session, the login service 115 returns a response indicating no authentication session to the HTTP server 112.

In step S11117, the HTTP server 112 checks whether an authentication session has been returned from the login service 115. When the HTTP server 112 confirms that an authentication session has been returned (YES in step S11117), the processing proceeds to step S11105. On the other hand, when the HTTP server 112 confirms that a response indicating no authentication session has been returned (NO in step S11117), the processing proceeds to step S11106. A response indicating no authentication session is returned in a case where the expiration date of the authentication session has expired before the reception of an HTTP request. In step S11105, the HTTP server 112 invalidates the authentication session acquired from the login service 115.

The authentication session invalidation processing is similar to that according to the first exemplary embodiment. In step S11106, the HTTP server 112 generates a new HTTP session. In step S11107, the HTTP server 112 adds the new HTTP session to the HTTP session storage unit 113. In step S11108, the HTTP server 112 sets in the response the response header "Set-Cookie" having the value of the HTTP session Cookie of the HTTP session generated in step S11106. In step S11109, the HTTP server 112 requests the login service 115 to generate a login page, and the login service 115 generates a login page and then returns the login page to the HTTP server 112. In step S11110, the HTTP server 112 transmits the login page to the web browser 109 as the body data of the HTTP response. In step S11111, the HTTP server 112 ends the HTTP request reception processing. In step S11112, the HTTP server 112 updates the expiration date of the HTTP session acquired in step S11102. The processing for updating the expiration date of the HTTP session is similar to that according to the first exemplary embodiment.

Figure 14B:
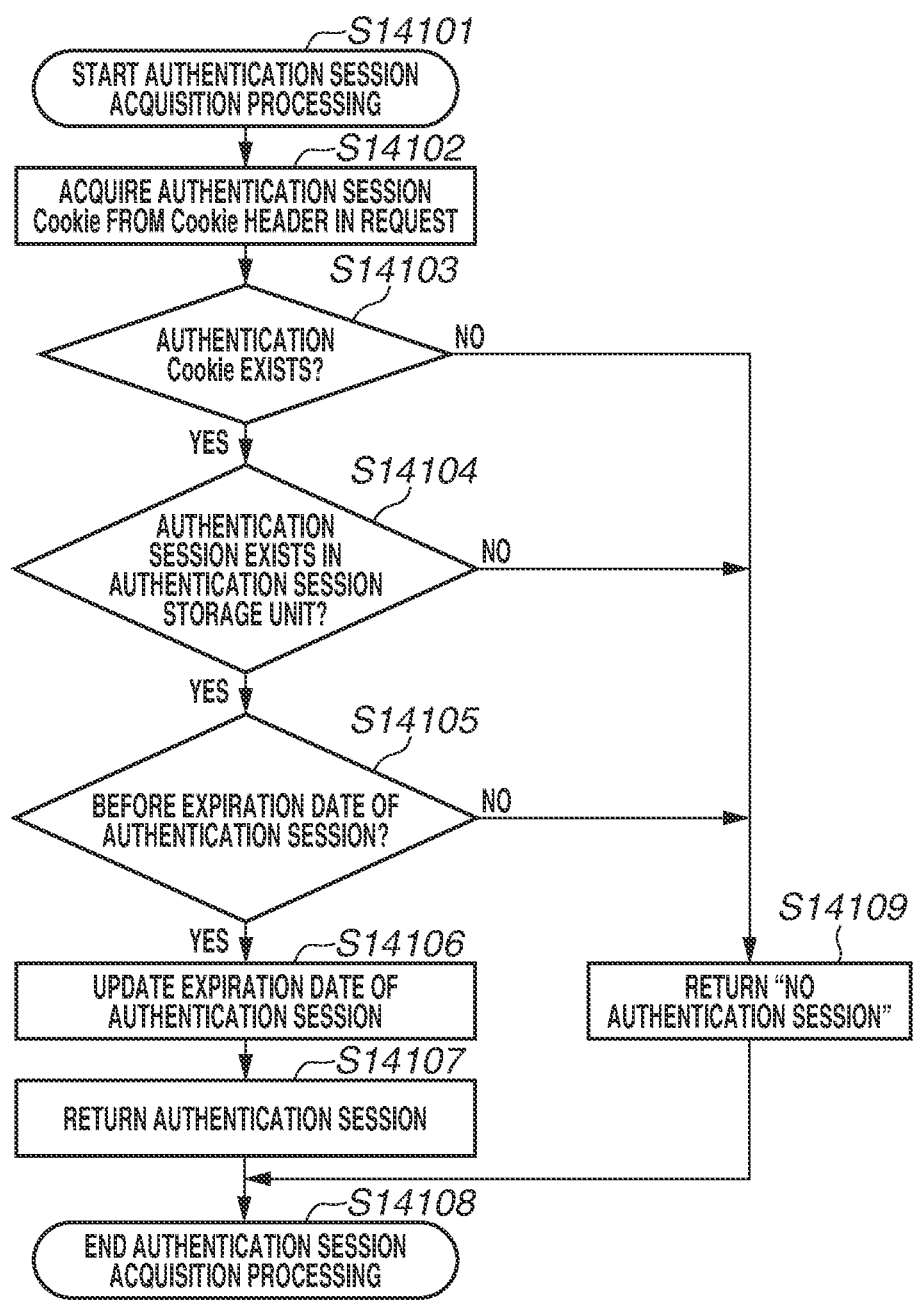

In step S11113, the HTTP server 112 requests the login service 115 for an authentication session, and the login service 115 performs the processing in steps S14101 to S14108 illustrated in FIG. 14B to acquire an authentication session. If the login service 115 can acquire an authentication session, the login service 115 returns the authentication session to the HTTP server 112. On the other hand, if the login service 115 cannot acquire an authentication session, the login service 115 returns a response indicating no authentication session. In step S11114, the HTTP server 112 checks whether an authentication session has been returned from the login service 115. When the HTTP server 112 confirms that an authentication session has been returned (YES in step S11114), the processing proceeds to step S11115. On the other hand, when the HTTP server 112 confirms that a response indicating no authentication session has been returned (NO in step S11114), the processing proceeds to step S11109. In step S11115, the HTTP server 112 requests the servlet 117 for the servlet processing, and the servlet 117 performs the servlet processing including processing for generating HTML. In step S11116, the HTTP server 112 transmits the HTML data generated by the servlet 117 to the web browser 109 as the body data of the HTTP response. In step S11111, the HTTP server 112 ends the HTTP request reception processing.

With the above-described configuration of the third exemplary embodiment, the HTTP server 112 can delete all of HTTP sessions stored in the HTTP session storage unit 113 at the time of a high-speed shutdown, and, after a high-speed startup, invalidate authentication sessions of the user who logged in before the high-speed shutdown.

OTHER EMBODIMENTS

Embodiments of the present disclosure can also be realized by a computer of a system or apparatus that reads out and executes computer executable instructions recorded on a storage medium (e.g., non-transitory computer-readable storage medium) to perform the functions of one or more of the above-described embodiment(s) of the present disclosure, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the Disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2016-054388, filed Mar. 17, 2016, which is hereby incorporated by reference herein in its entirety.

What is claimed is:

1. An information processing apparatus having at least a processor and at least a memory coupled to the at least the processor and having stored thereon instructions, when executed by the at least the processor, cooperating to act at least two services including:

a login service configured to perform authentication processing based on received authentication information and issues authentication identification information according to a validity of the authentication information; and a communication service configured to issue, upon reception of a first request from an external apparatus, communication identification information and transmit the communication identification information to the external apparatus together with a response and, upon reception of a request including the communication identification information, confirm the authentication identification information included in the request and transmit a response to the external apparatus, the information processing apparatus comprising:

a transition unit configured to, upon reception of a shutdown instruction, make a state transition to a power saving state where a power supply to a hardware resource of the information processing apparatus is stopped, without deleting information stored in a memory of the information processing apparatus; and a storage unit configured to, when the transition unit makes a state transition to the power saving state, store the issued communication identification information in the memory as invalidation scheduled communication identification information, wherein, after returning from the power saving state, in a case where the communication identification information included in the request received from the external apparatus coincides with the invalidation scheduled communication identification information stored by the storage unit, the communication service transmits to the login service a request for invalidating the authentication identification information included in the request received from the external apparatus and transmits a response for requesting the authentication information to the external apparatus, wherein the response for requesting the authentication information is screen information of a login page for inputting authentication information, and wherein the communication service receives the authentication information input via the login page from the external apparatus together with a login request, transmits the received authentication information to the login service, and transmits the authentication identification information received from the login service, as a response for the login request.

2. The information processing apparatus according to claim 1, wherein, in a case where the authentication identification information included in the request does not coincide with the invalidation scheduled communication identification information stored by the storage unit, the communication service confirms the authentication identification information included in the request and transmits a response of a processing result corresponding to the request to the external apparatus.

3. The information processing apparatus according to claim 1, wherein, even in a case where the communication identification information included in the request received from the external apparatus coincides with the invalidation scheduled communication identification information stored by the storage unit, if an expiration date of the authentication identification information included in the request received from the external apparatus has expired or if authentication identification information is not included in the request received from the external apparatus, the communication service does not transmit to the login service a request for invalidating the authentication identification information included in the request received from the external apparatus.

4. The information processing apparatus according to claim 1, further comprising an application service configured to receive the request from the external apparatus from the communication service, and perform processing corresponding to the received request, wherein, in a case where, upon reception of the request for invalidating the issued communication identification information transmitted from the application service to the communication service, the storage unit deletes from the memory the communication identification information specified by the application service and stores the specified communication identification information as invalidated communication identification information, and the transition unit makes a state transition to the power saving state, the storage unit stores in the memory the invalidated communication identification information, together with the issued communication identification information, as invalidation scheduled communication identification information.

5. The information processing apparatus according to claim 1, wherein the communication service is an HTTP server configured to issue an HTTP session as the authentication identification information.

6. The information processing apparatus according to claim 1, wherein, upon depression of a power switch provided on the information processing apparatus, the transition unit receives a shutdown instruction.

7. The information processing apparatus according to claim 1, wherein the hardware resource is a print engine configured to print an image on recording paper, and wherein, upon state transition to the power saving state, power supply to the print engine is stopped.

8. The information processing apparatus according to claim 1, wherein the invalidation refers to deleting information stored in the memory.

9. A method for controlling an information processing apparatus having at least a processor and at least a memory coupled to the at least the processor and having stored thereon instructions, when executed by the at least the processor, cooperating to act at least two services including:

a login service configured to perform authentication processing based on received authentication information and issue authentication identification information according to an validity of the authentication information; and a communication service configured to issue, upon reception of a first request from an external apparatus, communication identification information and transmit the communication identification information to the external apparatus together with a response and, upon reception of a request including the communication identification information, confirm the authentication identification information included in the request and transmit a response to the external apparatus, the method comprising:

making a state transition by a transition unit, upon reception of a shutdown instruction, to a power saving state where a power supply to a hardware resource of the information processing apparatus is stopped, without deleting information stored in a memory of the information processing apparatus, storing, when a state transition to the power saving state is made by the transition unit, the issued communication identification information in the memory as invalidation scheduled communication identification information, and transmitting by the communication service, after returning from the power saving state, in a case where the communication identification information included in the request received from the external apparatus coincides with the invalidation scheduled communication identification information stored by the storage unit, to the login service a request for invalidating the authentication identification information included in the request received from the external apparatus, and transmitting a response for requesting the authentication information to the external apparatus, wherein the response for requesting the authentication information is screen information of a login page for inputting authentication information, and wherein the communication service receives the authentication information input via the login page from the external apparatus together with a login request, transmits the received authentication information to the login service, and transmits the authentication identification information received from the login service, as a response for the login request.

10. A non-transitory storage medium storing a program, at least a processor and at least a memory coupled to the at least the processor and having stored thereon instructions, when executed by an information processing apparatus having at least two services including:

a login service configured to perform authentication processing based on received authentication information and issue authentication identification information according to a validity of the authentication information; and a communication service configured to issue, upon reception of a first request from an external apparatus, communication identification information and transmit the communication identification information to the external apparatus together with a response and, upon reception of a request including the communication identification information, confirm the authentication identification information included in the request and transmit a response to the external apparatus, to cause the information processing apparatus to perform a method, the method comprising:

making a state transition by a transition unit, upon reception of a shutdown instruction, to a power saving state where a power supply to a hardware resource of the information processing apparatus is stopped, without deleting information stored in a memory of the information processing apparatus, storing, when a state transition to the power saving state is made by the transition unit, the issued communication identification information in the memory as invalidation scheduled communication identification information, and transmitting by the communication service, after returning from the power saving state, in a case where the communication identification information included in the request received from the external apparatus coincides with the invalidation scheduled communication identification information stored by the storage unit, to the login service a request for invalidating the authentication identification information included in the request received from the external apparatus, and transmitting a response for requesting the authentication information to the external apparatus, wherein the response for requesting the authentication information is screen information of a login page for inputting authentication information, and wherein the communication service receives the authentication information input via the login page from the external apparatus together with a login request, transmits the received authentication information to the login service, and transmits the authentication identification information received from the login service, as a response for the login request.

* * * * *